(12) United States Patent
Hsu

(10) Patent No.: US 12,147,810 B2
(45) Date of Patent: Nov. 19, 2024

(54) PROCESSOR, OPERATION METHOD, AND LOAD-STORE DEVICE FOR IMPLEMENTATION OF ACCESSING VECTOR STRIDED MEMORY

(71) Applicant: ANDES TECHNOLOGY CORPORATION, Hsinchu (TW)

(72) Inventor: Chia-Wei Hsu, Tainan (TW)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 59 days.

(21) Appl. No.: 17/846,030

(22) Filed: Jun. 22, 2022

(65) Prior Publication Data

US 2023/0418614 A1 Dec. 28, 2023

(51) Int. Cl.
*G06F 9/34* (2018.01)
*G06F 9/30* (2018.01)
*G06F 9/345* (2018.01)

(52) U.S. Cl.
CPC ........ *G06F 9/3455* (2013.01); *G06F 9/30036* (2013.01); *G06F 9/30043* (2013.01); *G06F 9/3012* (2013.01)

(58) Field of Classification Search
CPC ............. G06F 9/30032; G06F 9/30036; G06F 9/30038; G06F 9/3004; G06F 9/30043; G06F 9/34; G06F 9/345; G06F 9/3455; G06F 9/35; G06F 9/355
See application file for complete search history.

(56) References Cited

U.S. PATENT DOCUMENTS

| 5,689,653 A * | 11/1997 | Karp | G06F 9/30036 |
| | | | 712/E9.047 |
| 6,813,701 B1 * | 11/2004 | Ansari | G06F 9/30043 |
| | | | 712/E9.047 |
| 10,769,070 B2 * | 9/2020 | Pusdesris | G06F 12/0862 |
| 2007/0255903 A1 * | 11/2007 | Tsadik | G06F 9/3885 |
| | | | 711/118 |

(Continued)

FOREIGN PATENT DOCUMENTS

| TW | I731892 | 7/2021 |
| TW | I740859 | 10/2021 |
| TW | I760341 | 4/2022 |

OTHER PUBLICATIONS

"Office Action of Taiwan Counterpart Application", issued on Mar. 3, 2023, p. 1-p. 5.

*Primary Examiner* — Andrew Caldwell
*Assistant Examiner* — Kasim Alli
(74) *Attorney, Agent, or Firm* — JCIPRNET

(57) ABSTRACT

A processor, an operation method, and a load-store device are provided. The processor is adapted to access a memory. The processor includes a vector register file (VRF) and the load-store device. The load-store device is coupled to the VRF. The load-store device performs a strided operation on the memory. In a current iteration of the strided operation, the load-store device reads a plurality of first data elements at a plurality of discrete addresses in the memory and writes the first data elements into the VRF, or the load-store device reads a plurality of second data elements from the VRF and writes the second data elements into a plurality of discrete addresses in the memory during the current iteration of the strided operation.

27 Claims, 9 Drawing Sheets

(56) References Cited

U.S. PATENT DOCUMENTS

| | | | |
|---|---|---|---|
| 2012/0060016 A1* | 3/2012 | Eichenberger | G06F 9/30036 712/4 |
| 2012/0151156 A1* | 6/2012 | Citron | G06F 12/0897 711/E12.001 |
| 2013/0046928 A1* | 2/2013 | Ramaraju | G06F 9/355 711/108 |
| 2015/0052333 A1* | 2/2015 | Hughes | G06F 9/30112 712/208 |
| 2017/0168946 A1 | 6/2017 | Wang | |
| 2022/0342590 A1* | 10/2022 | Norrie | G06F 12/0292 |
| 2022/0413852 A1* | 12/2022 | Williams | G06F 9/30109 |
| 2023/0063976 A1* | 3/2023 | Fernsler | G06F 9/3858 |

\* cited by examiner

PROCESSOR, OPERATION METHOD, AND LOAD-STORE DEVICE FOR IMPLEMENTATION OF ACCESSING VECTOR STRIDED MEMORY

BACKGROUND

Technical Field

The disclosure relates to an electronic circuit; more particularly, the disclosure relates to a processor, an operation method, and a load-store device for implementation of accessing a vector strided memory.

Description of Related Art

Vector non-unit (constant) strided operations refer to accessing data elements discretely distributed at different addresses in a memory. In the first iteration of the strided operation, a base effective address serves as the first access address, and an access operation is performed on the first data element at the first access address in the memory. In the second iteration of the strided operation, a byte offset (also referred to as a stride) is added to the base effective address to generate the second access address, and an access operation is performed on the second data element at the second access address in the memory. In the third iteration of the strided operation, two byte offsets are added to the base effective address to generate the third access address, and an access operation is performed on the third data element at the third access address in the memory. The rest may be deduced from the above description. The vector strided operations may be performed to access the data elements discretely distributed at different addresses in the memory. In each iteration of the strided operation, one access address is generated at a time according to the related art. Hence, if n target data (data elements) are discretely distributed at n addresses in the memory, the access operations should be performed on the n target data in the memory in n iterations according to the related art.

SUMMARY

The disclosure provides a processor, an operation method, and a load-store device for accelerating strided operations.

In an embodiment of the disclosure, the processor is adapted to access a memory. The memory includes a vector register file (VRF) and a load-store device. The load-store device is coupled to the VRF and configured to perform a strided operation on the memory. The load-store device reads a plurality of first data elements at a plurality of discrete addresses in the memory and writes the first data elements into the VRF in a current iteration of the strided operation, or the load-store device reads a plurality of second data elements from the VRF and respectively writes the second data elements into a plurality of discrete addresses in the memory in the current iteration of the strided operation.

In an embodiment of the disclosure, the operation method includes following steps. A strided operation is performed on a memory by a load-store device. In a current iteration of the strided operation, a plurality of first data elements at a plurality of discrete addresses in the memory are read by the load-store device, and the first data elements are written into a VRF by the load-store device, or a plurality of second data elements are read by the load-store device from the VRF, and the second data elements into are respectively written into a plurality of discrete addresses in the memory.

In an embodiment of the disclosure, the load-store device includes a strided address generator and a load-store circuit. The strided address generator generates a plurality of strided addresses based on a current base address and a stride. The load-store circuit is coupled to the strided address generator to receive the strided addresses. The load-store circuit reads a plurality of first data elements in a memory based on the current base address and the strided addresses and writes the first data elements into a VRF, or the load-store circuit reads a plurality of second data elements from the VRF and respectively writes the second data elements into the memory based on the current base address and the strided addresses.

In view of the above, the load-store device provided in one or more embodiments of the disclosure is capable of performing the strided operation on the memory. In the same iteration of the strided operation, the load-store device may perform access at a plurality of discrete addresses in the memory, so as to accelerate the strided operation. When the load-store device reads the first data elements at the discrete addresses in the memories, the load-store device is able to write the first data elements into the VRF for vector function units (VFUs) of the processor to use. After the VFUs write the processed results (the second data elements) back to the VRF, the load-store device may read the second data elements from the VRF, and write the second data elements into the discrete addresses in the memory respectively in an iteration of the strided operation.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTIONS OF EMBODIMENTS

Figure 1A:
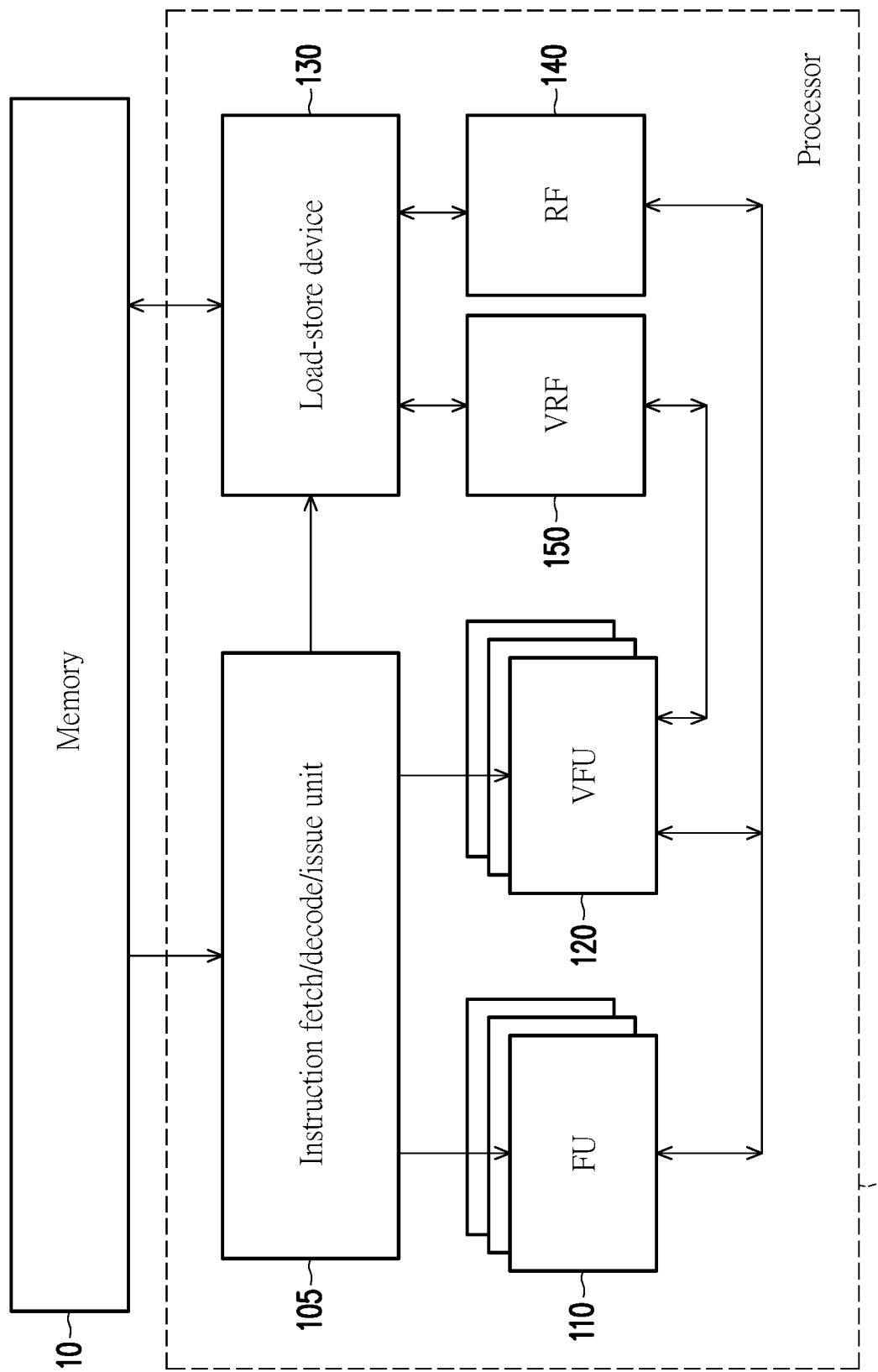
FIG. 1A is a schematic view of a circuit block of a processor according to an embodiment of the disclosure.

The term "coupled (or connected)" throughout this disclosure (including the claims) may refer to any direct or indirect means of connection. For instance, if the first device is described as being coupled (or connected) to the second device, it should be interpreted as the first device may be directly connected to the second device, or the first device may be indirectly connected to the second device through other devices or connection means. Terms such as "first" and "second" throughout this disclosure (including the claims) serve to name the elements or to distinguish different embodiments or scope of protection rather than posing a limit to the maximum or minimum number of the elements or lower bounds nor limiting the order of the elements. Besides, wherever possible, the elements/the components/the steps using the same reference numbers in the drawings and embodiments represent the same or similar parts. Reference can be made to descriptions of the elements/the components/the steps using the same reference numbers or represented by the same terminology in different embodiments.

FIG. 1A is a schematic view of a circuit block of a processor according to an embodiment of the disclosure. The processor 100 may be a general-purpose processor or a specific-purpose processor. The general-purpose processor may include a central processing unit or any other general-purpose processor. The specific-purpose processor may include a network processor, a communication processor, a digital signal processor (DSP), an embedded processor, or any other specific-purpose processor. The architectural design of the instruction set of the processor may be any of the following: complex instruction set computing (CISC), reduced instruction set computing (RSIC), very long instruction word (VLIW), a combination thereof, or an instruction set of any other kind. According to the actual design, the processor 100 may be a single instruction multiple data (SIMD) processor, a vector processor, or any other processor.

The processor 100 may access a memory 10. For instance, the processor 100 may read programming codes from the memory 10 and execute them. In the process of executing the programming codes, the processor 100 may read data elements from the memory 10 and/or write the data elements back to the memory 10. The processor 100 shown in FIG. 1A includes a vector register file (VRF) 150 and a load-store device 130. According to the actual design, the processor 100 may further include an instruction fetch/decode/issue unit 105, a function unit (FU) 110, a vector function unit (VFU) 120, and a register file (RF) 140. The FU 110 and/or the VFU 120 may include an integer FU, a floating-point FU, and/or any other FU. The instruction fetch/decode/issue unit 105 is capable of fetching an instruction from the memory 10 through an instruction cache (not shown). The instruction fetch/decode/issue unit 105 may decode the fetched instruction and control the FU 110, the VFU 120, and the load-store device 130 based on the decoded result. Based on the decoded result, the FU 110 and/or the VFU 120 may perform relevant functional operations in association with the fetched instruction.

According to the actual design, the RF 140 includes an integer RF, a floating-point RF, and/or any other RF. A data width of the RF 140 may be 32 bits, 64 bits, or any other width. When the instruction requires reading the data elements in the memory 10, based on the control of the instruction fetch/decode/issue unit 105, the load-store device 130 may read the data elements from the memory 10 and store the data elements at the RF 140. Based on the operation of the instruction, the FU 110 and the VFU 120 may obtain the data elements from the RF 140. After the instruction execution, the FU 110 and the VFU 120 may write the processed result back to the RF 140. Either the FU 110 or the VFU 120 may access one data element from the RF 140 in one cycle.

According to the actual design, the VRF 150 includes an integer RF, a floating-point RF, and/or any other RF. A data width of each VRF 150 may be greater than the data width of the RF 140. For instance, the data width of the VRF 150 may be 256 bits, 512 bits, or any other width. When the instruction requires reading a plurality of data elements in the memory 10, based on the control of the instruction fetch/decode/issue unit 105, the load-store device 130 may read the data elements from the memory 10 and store the data elements in the VRF 150. Based on the operation of the vector processing instruction, the VFU 120 may obtain data elements (first data elements) from the VRF 150. After the vector processing instruction execution, the VFU 120 may write the processed result (second data elements) back to the VRF 150.

Based on the control of the instruction fetch/decode/issue unit 105, the load-store device 130 may access the memory 10 through a data cache (not shown). The load-store device 130 coupled to the VRF 150. In some operation scenarios, the load-store device 130 may read the data elements in the memory 10 through the data cache and load the data elements into the RF 140 or the VRF 150. In other operation scenarios, the load-store device 130 may read the data elements from the RF 140 or the VRF 150 and store the data elements in the memory 10 through the data cache.

Based on the control of the instruction fetch/decode/issue unit 105, the load-store device 130 may perform a strided operation on the memory 10. The strided operation is to access the data elements discretely distributed at different addresses in the memory 10. In some operation scenarios, the load-store device 130 may read a plurality of first data elements at a plurality of discrete addresses in the memory 10 in the same iteration (a current iteration) of a strided operation and write the first data elements into the VRF 150. In other operation scenarios, the load-store device 130 may read a plurality of second data elements from the VRF 150 and respectively write the second data elements into a plurality of discrete addresses in the memory 10 in the same iteration (a current iteration) of the strided operation.

Figure 1B:
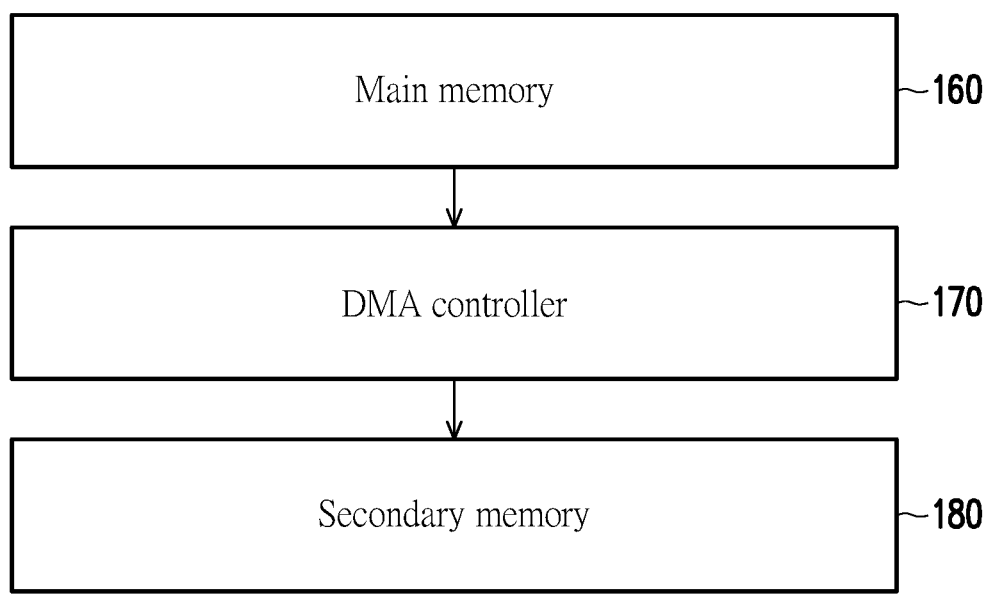
FIG. 1B is a schematic view of a circuit block of a processor according to another embodiment of the disclosure.

According to the actual design, the processor 100 shown in FIG. 1A may be packaged as one single integrated circuit; however, the implementation manner provided in the disclosure should not be limited to the embodiment shown in FIG. 1A. In other embodiments, the load-store device 130 and the VRF 150 may be packaged as different integrated circuits. For instance, the load-store device 130 may be applied to a direct memory access (DMA) controller or other memory access circuits. FIG. 1B is a schematic view of a circuit block of a processor according to another embodiment of the disclosure. The electronic device shown in FIG. 1B includes a main memory 160, a DMA controller 170, and a secondary memory 180. The description of the main memory 160 shown in FIG. 1B may be deduced from the relevant description of the memory 10 shown in FIG. 1A, the description of the DMA controller 170 shown in FIG. 1B may be deduced from the relevant description of the load-store device 130 shown in FIG. 1A, and the description of the secondary memory 180 shown in FIG. 1B may be deduced from the relevant description of the VRF 150 shown in FIG. 1A; hence, no repetitive description will be provided hereinafter.

Figure 2:
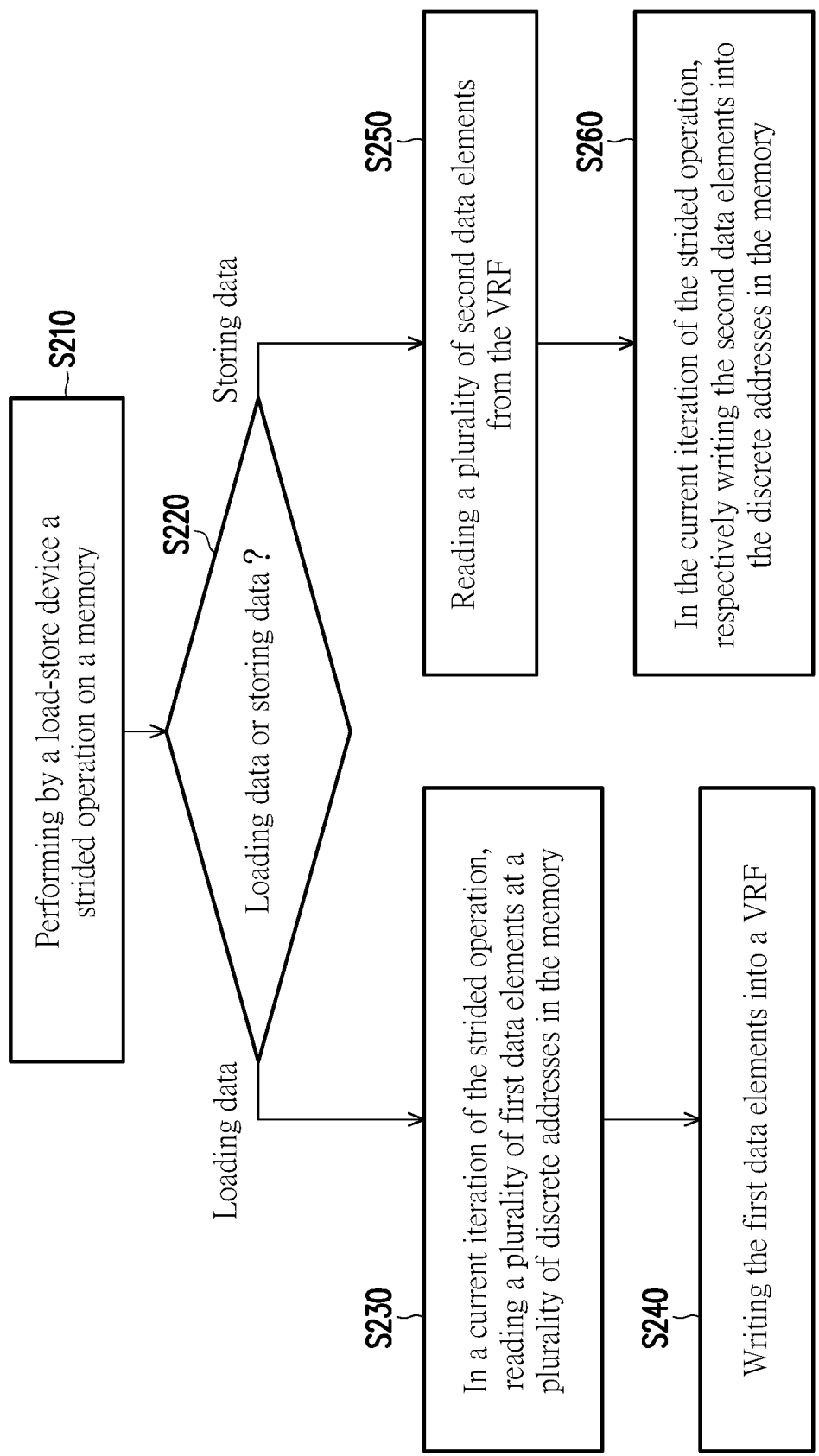
FIG. 2 is a schematic flowchart of an operation method of a processor according to an embodiment of the disclosure.

FIG. 2 is a schematic flowchart of an operation method of a processor according to an embodiment of the disclosure. With reference to FIG. 1A and FIG. 2, in step S210, the load-store device 130 may perform a strided operation on the memory 10. When the load-store device 130 intends to load the first data elements of the memory 10 into the VRF 150 (the determination result in step S220 is "loading data"), the strided operation includes steps S230 and S240. When the load-store device 130 intends to store the second data elements of the VRF 150 into the memory 10 (the determination result in step S220 is "storing data"), the strided operation includes steps S250 and S260.

Figure 3:
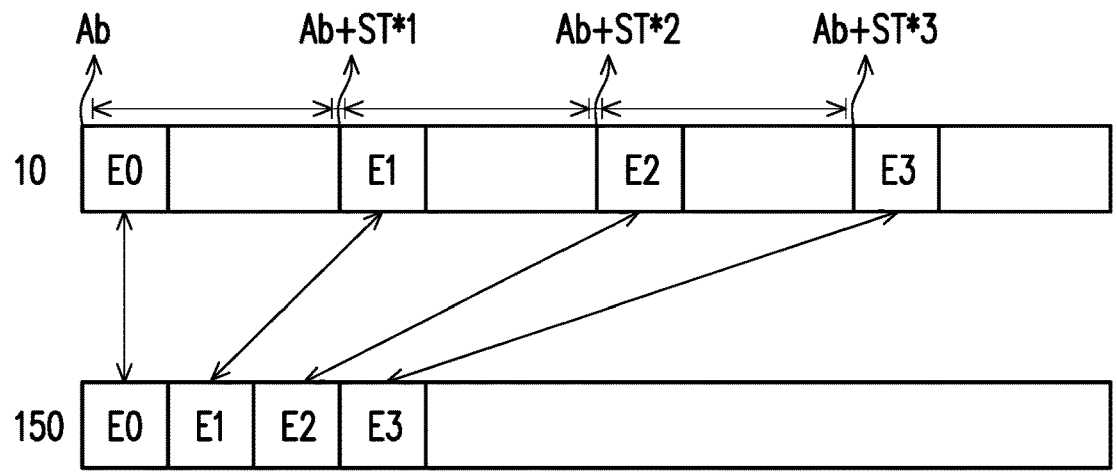
FIG. 3 is a schematic view of a specific example of a strided operation according to an embodiment of the disclosure.

FIG. 3 is a schematic view of a specific example of a strided operation according to an embodiment of the disclosure. With reference to FIG. 1A, FIG. 2, and FIG. 3, it is assumed that the load-store device 130 intends to load the first data elements of the memory 10 into the VRF 150. In the current iteration of the strided operation, the load-store device 130 may read a plurality of first data elements at a plurality of discrete addresses in the memory 10 (step S230) and write the first data elements into the VRF 150 (step S240). For instance, in the same iteration of the strided operation, the load-store device 130 generates a plurality of strided addresses of the current iteration by applying a current base address Ab and a stride (or referred to as an offset) ST. The scenario shown in FIG. 3 is taken as an example. The load-store device 130 may generate a first strided address (i.e., Ab), a second strided address (i.e., Ab+ST*1), a third strided address (i.e., Ab+ST*2), and a fourth strided address (i.e., Ab+ST*3) of the current iteration. Then, in the same iteration of the strided operation, the load-store device 130 may load a data element E0, a data element E1, a data element E2, and a data element E3 at the discrete addresses (i.e., "Ab", "Ab+ST*1", "Ab+ST*2", and "Ab+ST*3") in the memory 10 into the VRF 150. At the end of one iteration, the current base address Ab is updated to point at the data elements to be processed in the next iteration. The rest may be deduced therefrom; that is, in a vector strided operation to be performed in the next iteration, other data elements discretely distributed at different addresses in the memory 10 may be loaded into the VRF 150.

It is assumed that the load-store device 130 intends to store the second data elements of the VRF 150 into the memory 10. The load-store device 130 may read a plurality of second data elements from the VRF 150 (step S250) and respectively write the second data elements into a plurality of discrete addresses in the memory 10 in the current iteration of the strided operation (step S260). For instance, the load-store device 130 may read the data elements E0, E1, E2, and E3 from the VRF 150. The load-store device 130 may generate a plurality of strided addresses of the current iteration by applying the current base address Ab and the stride ST, i.e., the strided address "Ab", "Ab+ST*1", "Ab+ST*2", and "Ab+ST*3". In the same iteration of the strided operation, the load-store device 130 may respectively write the data elements E0, E1, E2, and E3 into a plurality of discrete addresses (i.e., "Ab", "Ab+ST*1", "Ab+ST*2", and "Ab+ST*3") in the memory 10. At the end of one iteration, the current base address Ab is updated to point at the address where the data elements are going to be written in the next iteration. The rest may be deduced therefrom; that is, in a vector strided operation to be performed in the next iteration, the data elements of the VRF 150 may be respectively stored into a plurality of discrete addresses in the memory 10.

To sum up, the load-store device 130 may perform the strided operation on the memory 10. In the same iteration of the strided operation, the load-store device 130 may access a plurality of discrete addresses in the memory 10 to accelerate the strided operation. When the load-store device 130 reads the first data elements at the discrete addresses in the memory 10, the load-store device 130 may write the first data elements into the VRF 150 for the FU of the processor 100 (e.g., the VFU 120) to use. After the VFU 120 writes the processed results (the second data elements) back to the VRF 150, the load-store device 130 may read the second data elements from the VRF 150 and respectively write the second data elements into the discrete addresses in the memory 10 in one iteration of the strided operation.

Figure 4:
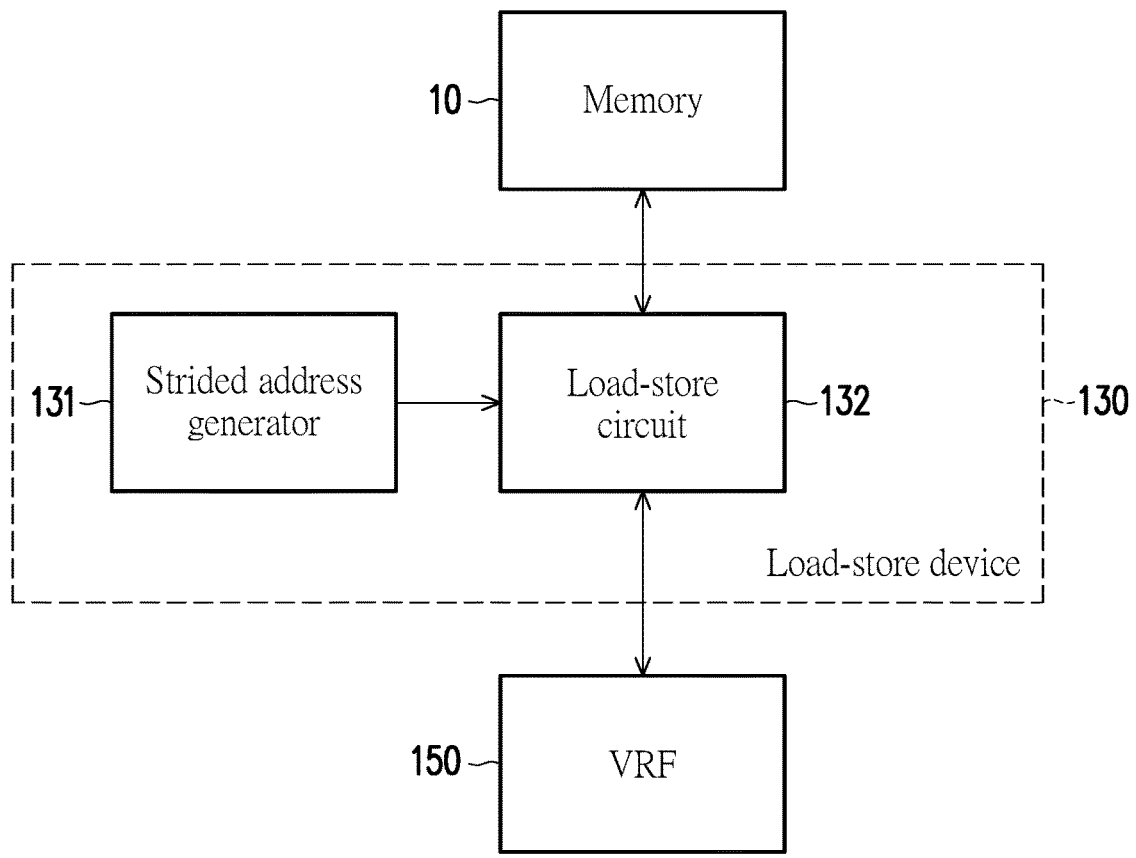
FIG. 4 is a schematic view of a circuit block of a load-store device according to an embodiment of the disclosure.

FIG. 4 is a schematic view of a circuit block of the load-store device 130 according to an embodiment of the disclosure. The descriptions of the memory 10, the load-store device 130, and the VRF 150 shown in FIG. 4 may be deduced from the relevant descriptions of the memory 10, the load-store device 130, and the VRF 150 shown in FIG. 1A, and no repetitive description will be given hereinafter. The load-store device 130 shown in FIG. 4 may serve as one of many embodiments of the load-store device 130 shown in FIG. 1A.

In the embodiment shown in FIG. 4, the load-store device 130 includes a strided address generator 131 and a load-store circuit 132. The strided address generator 131 may generate a plurality of strided addresses based on the current base address Ab and the stride ST. For instance (but not limited thereto), the strided address generator 131 may calculate $\{Cn, OFFn\} = LSB1 + LSB2*(n-1)$ to generate N strided addresses of the current iteration, where n is an integer greater than 0 and less than or equal to N, and N is an integer determined according to the actual design. In some embodiments, the integer N may be 8 or other integers. LSB2 is the least significant bits part of the stride ST, LSB1 is the least significant bits part of the current base address Ab, $\{Cn, OFFn\}$ is the n-th strided address of the strided addresses, OFFn is the offset part of the n-th strided address $\{Cn, OFFn\}$, and Cn is the carry part of the n-th strided address $\{Cn, OFFn\}$. The number of bits (width) of the least significant bits parts LSB1 and LSB2 may be determined according to the actual design. For instance, the width (addressing space) of the least significant bits part LSB1 and/or the least significant bits part LSB2 may be adapted to the width of a line buffer of the load-store circuit 132. In some embodiments, the width of the least significant bits part LSB1 and/or the least significant bits part LSB2 may be 5 bits or any other number of bits.

The load-store circuit 132 is coupled to the strided address generator 131 to receive a plurality of strided addresses. When the load-store device 130 intends to load a plurality of first data elements of the memory 10 into the VRF 150, the load-store circuit 132 may read the first data elements of the memory 10 based on the current base address Ab and the strided addresses and write the first data elements to the VRF 150. Alternatively, when the load-store device 130 intends to store a plurality of second data elements of the VRF 150 into the memory 10, the load-store circuit 132 may read the second data elements from the VRF 150 and respectively write the second data elements into a plurality of discrete addresses in the memory 10 based on the current base address Ab and the strided addresses. The width of the first data elements and/or the width of the second data elements, i.e., data element length ELEN, may be determined according to actual applications. For instance, in some application scenarios, the data element length ELEN may be 1 byte, 2 bytes, 4 bytes, 8 bytes, or other lengths.

At the end of an iteration, the strided address generator 131 may update the current base address Ab based on the usage status of the strided address {Cn,OFFn}, so that the current base address Ab points at the data elements to be processed in the next iteration. For instance, assuming that the first (n−1) strided addresses of the N strided addresses ({C1,OFF1} to {CN,OFFN}) are applied/processed by the load-store circuit 132 in one iteration, the strided address generator 131 may calculate Ab2={MSB1+Cn,OFFn} to update the current base address Ab, wherein MSB1 is the most significant bits part of the current base address Ab, and Ab2 is the new base address Ab of the next iteration.

Figure 5:
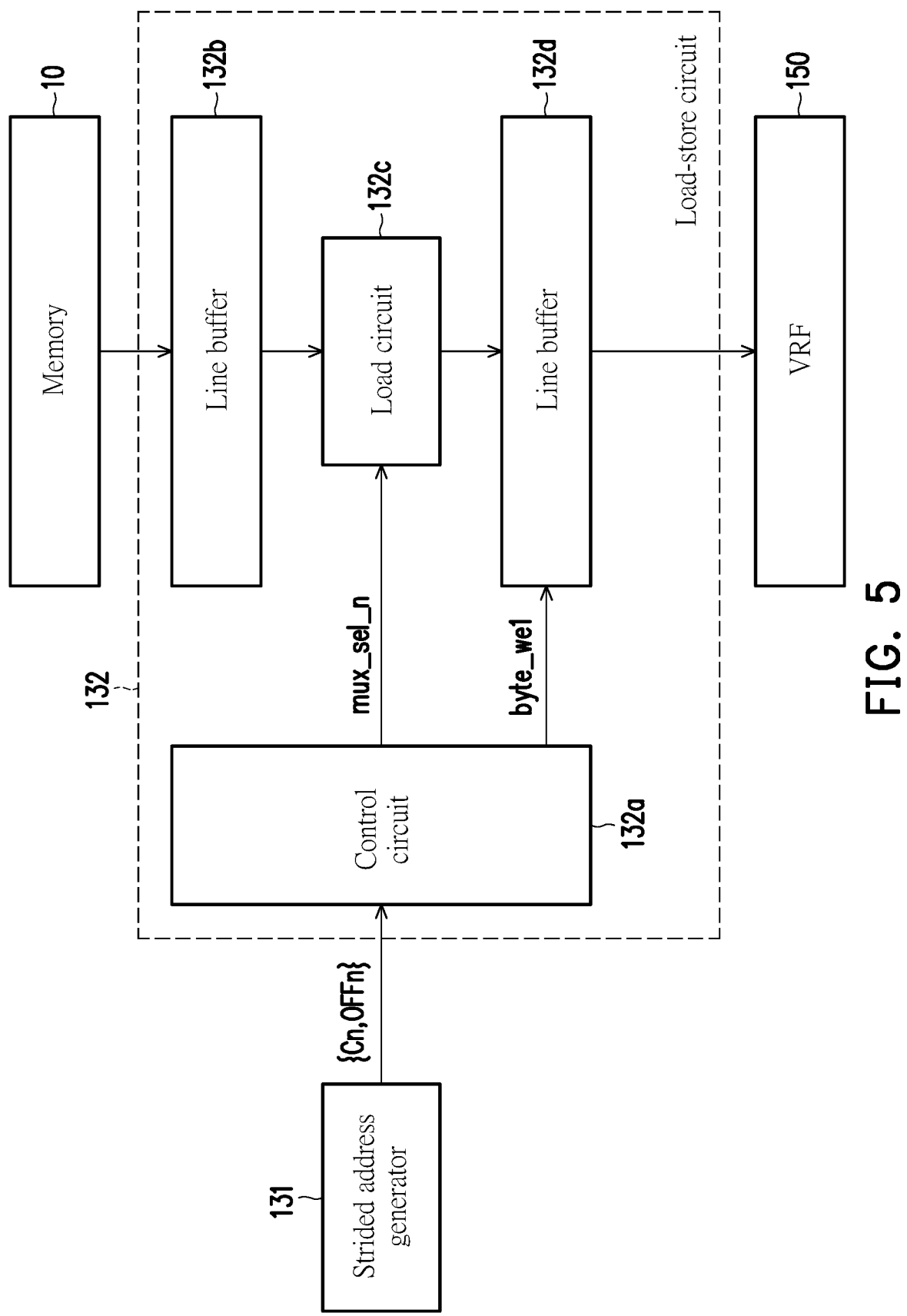
FIG. 5 is a schematic view of a circuit block of a load-store circuit according to an embodiment of the disclosure.

FIG. 5 is a schematic view of a circuit block of the load-store circuit 132 according to an embodiment of the disclosure. The description of the memory 10 and the VRF 150 shown in FIG. 5 may be deduced from the relevant description of the memory 10 and the VRF 150 shown in FIG. 1A, and the description of the load-store circuit 132 shown in FIG. 5 may be deduced from the relevant description of the load-store circuit 132 shown in FIG. 4; hence, no repetitive description will be provided hereinafter. The load-store circuit 132 shown in FIG. 5 may serve as one of many embodiments of the load-store circuit 132 shown in FIG. 4.

In the embodiment shown in FIG. 5, the load-store circuit 132 includes a control circuit 132a, a line buffer 132b, a load circuit 132c, and a line buffer 132d. The line buffer 132b may read a plurality of bytes at the discrete addresses from the memory 10 in the current iteration based on the most significant bits part MSB1 of the current base address Ab, wherein the bytes include the first data elements. The width of the line buffer 132b may be determined according to the actual design. For instance, in some application scenarios, the width of the line buffer 132b may be 32 bytes (256 bits) or any other width. It is assumed that the width of the line buffer 132b is 32 bytes, and the width of the least significant bits part LSB1 of the current base address Ab and/or the width of the least significant bits part LSB2 of the stride ST may be 5 bits, so as to be adapted for the width of the line buffer 132b. It is assumed that the current base address Ab is {MSB1, LSB1}, and the line buffer 132b may read a plurality of bytes at the discrete addresses {MSB1,0b00000} to {MSB1,0b11111} from the memory 10 in the current iteration.

The control circuit 132a may be coupled to the strided address generator 131 to receive N strided addresses (i.e., {Cn,OFFn}, wherein n is an integer greater than 0 and less than or equal to N). The control circuit 132a may select one or a plurality of the offset parts OFFn of the strided addresses based on the data element length ELEN to generate N offset values, i.e., offn. For instance, it is assumed that the number of the strided addresses {Cn,OFFn}, i.e., N, is 8. In the application scenario where the data element length ELEN is 1 byte, the control circuit 132a may select the offset parts OFF1 to OFF8 as the offset values off1 to off8. In the application scenario where the data element length ELEN is 2 bytes, the control circuit 132a may select the offset parts OFF1 to OFF4 to generate the offset values off1 to off8. For instance, the offset values off1 to off8 are "OFF1", "OFF1+1", "OFF2", "OFF2+1", "OFF3", "OFF3+1", "OFF4", and "OFF4+1", respectively. In the application scenario where the data element length ELEN is 4 bytes, the control circuit 132a may select the offset parts OFF1 and OFF2 to generate the offset values off1 to off8. For instance, the offset values off1 to off8 are "OFF1", "OFF1+1", "OFF1+2", "OFF1+3", "OFF2", "OFF2+1", "OFF2+2", and "OFF2+3", respectively. In the application scenario where the data element length ELEN is 8 bytes, the control circuit 132a may select the offset part OFF1 to generate the offset values off1 to off8. For instance, the offset values off1 to off8 are "OFF1", "OFF1+1", "OFF1+2", "OFF1+3", "OFF1+4", "OFF1+5", "OFF1+6", and "OFF1+7", respectively.

The control circuit 132a may apply a write pointer wr_ptr to point at a loading location of the current vector register in the line buffer 132d. The control circuit 132a may rotate the offset values offn based on the write pointer wr_ptr to generate N multiplexer select signals mux_sel_n. For instance, it is assumed that N is 8, and the control circuit 132a may generate 8 multiplexer select signals mux_sel_1 to mux_sel_8 with use of Table 1 below. Although Table 1 exemplifies the range of the write pointer wr_ptr as 0 to 7, other ranges of the write pointer wr_ptr may be deduced from Table 1. In other embodiment, the way to generate the multiplexer select signal mux_sel_n is not limited to what is provided in Table 1.

TABLE 1

Examples of rotating the offset values offn based on the write pointer wr_ptr

| | wr_ptr | | | | | | | |
|---|---|---|---|---|---|---|---|---|
| | 0 | 1 | 2 | 3 | 4 | 5 | 6 | 7 |
| mux_sel_1 | off1 | off8 | off7 | off6 | off5 | off4 | off3 | off2 |
| mux_sel_2 | off2 | off1 | off8 | off7 | off6 | off5 | off4 | off3 |
| mux_sel_3 | off3 | off2 | off1 | off8 | off7 | off6 | off5 | off4 |
| mux_sel_4 | off4 | off3 | off2 | off1 | off8 | off7 | off6 | off5 |
| mux_sel_5 | off5 | off4 | off3 | off2 | off1 | off8 | off7 | off6 |
| mux_sel_6 | off6 | off5 | off4 | off3 | off2 | off1 | off8 | off7 |
| mux_sel_7 | off7 | off6 | off5 | off4 | off3 | off2 | off1 | off8 |
| mux_sel_8 | off8 | off7 | off6 | off5 | off4 | off3 | off2 | off1 |

The load circuit 132c is coupled to the control circuit 132a to receive the multiplexer select signal mux_sel_n. The load circuit 132c may collect the first data elements from the bytes of the line buffer 132b based on the multiplexer select signal mux_sel_n. The second line buffer 132d is coupled to the load circuit 132c to receive the first data elements.

The control circuit 132a may also calculate OVRn=Cn| (MSB2≠0) to generate the overflow value of the current iteration, wherein OVRn represents the n-th bit of the overflow value, Cn is the carry part of the n-th strided address {Cn,OFFn} provided by the strided address generator 131, an operator is an OR operation, and MSB2 is the most significant bits part of the stride ST. The overflow value has N bits. The control circuit 132a may select at least one bit of the overflow value based on the data element length ELEN to generate N overflow bits "ovrn". For instance, it is assumed that N is 8, wherein the lowest overflow bit ovr1 is always "0". In an application scenario where the data element length ELEN is 1 byte, the control circuit 132a may select the bits OVR2 to OVR8 of the overflow value as the overflow bits ovr2 to ovr8. In the application scenario where the data element length ELEN is 2 bytes, the control circuit 132a may select the bits OVR2 to OVR4 of the overflow value to generate the overflow bits ovr1 to ovr8. For instance, the overflow bits ovr1 to ovr8 are "0", "0", "OVR2", "OVR2", "OVR3", "OVR3", "OVR4", and "OVR4", respectively. In the application scenario where the data element length ELEN is 4 bytes, the control circuit 132*a* may select the bit OVR2 of the overflow value to generate the overflow bits ovr1 to ovr8. For instance, the overflow bits ovr1 to ovr8 are "0", "0", "0", "0", "OVR2", "OVR2", "OVR2", and "OVR2", respectively. In the application scenario where the data element length ELEN is 8 bytes, the control circuit 132*a* may set all the overflow bits ovr1 to ovr8 as "0".

The control circuit 132*a* may invert the overflow bits ovrn to generate N inverted overflow bits "ovrbn". The control circuit 132*a* may shift the inverted overflow bits ovrbn based on the write pointer wr_ptr to generate a byte-write-enable signal byte_we1. The byte-write-enable signal byte_we1 has M+N−1 bits, wherein M is an integer determined according to the actual design. The line buffer 132*d* may determine which byte locations of the line buffer 132*d* to write the first data elements provided by the load circuit 132*c* into based on the byte-write-enable signal byte_we1.

For instance, it is assumed that M is 32 and N is 8, the overflow bits ovr1 to ovr8 are "00000000", and the write pointer wr_ptr is 4. The control circuit 132*a* may invert the overflow bits ovr1 to ovr8, so that the inverted overflow bits ovrb1 to ovrb8 are "11111111". The control circuit 132*a* may shift the inverted overflow bits ovrb1 to ovrb8 to the left (in a direction toward the upper bits) by 4 bits based on the write pointer wr_ptr, so that the byte-write-enable signal byte_we1 is "00 . . . 00 11111111 0000". Each bit of the byte-write-enable signal byte_we1 corresponds to one byte location in the line buffer 132*d*. If a certain bit of the byte-write-enable signal byte_we1 is "0", it indicates that a corresponding byte location in the line buffer 132*d* refuses to be written by the load circuit 132*c*. By contrast, if a certain bit of the byte-write-enable signal byte_we1 is "1", it indicates that a corresponding byte location in the line buffer 132*d* may be written by the load circuit 132*c*. Therefore, the line buffer 132*d* may determine the byte locations of the line buffer 132*d* where the 8 bytes (a plurality of first data elements) provided by the load circuit 132*c* are written based on the byte-write-enable signal byte_we1.

Figure 6:
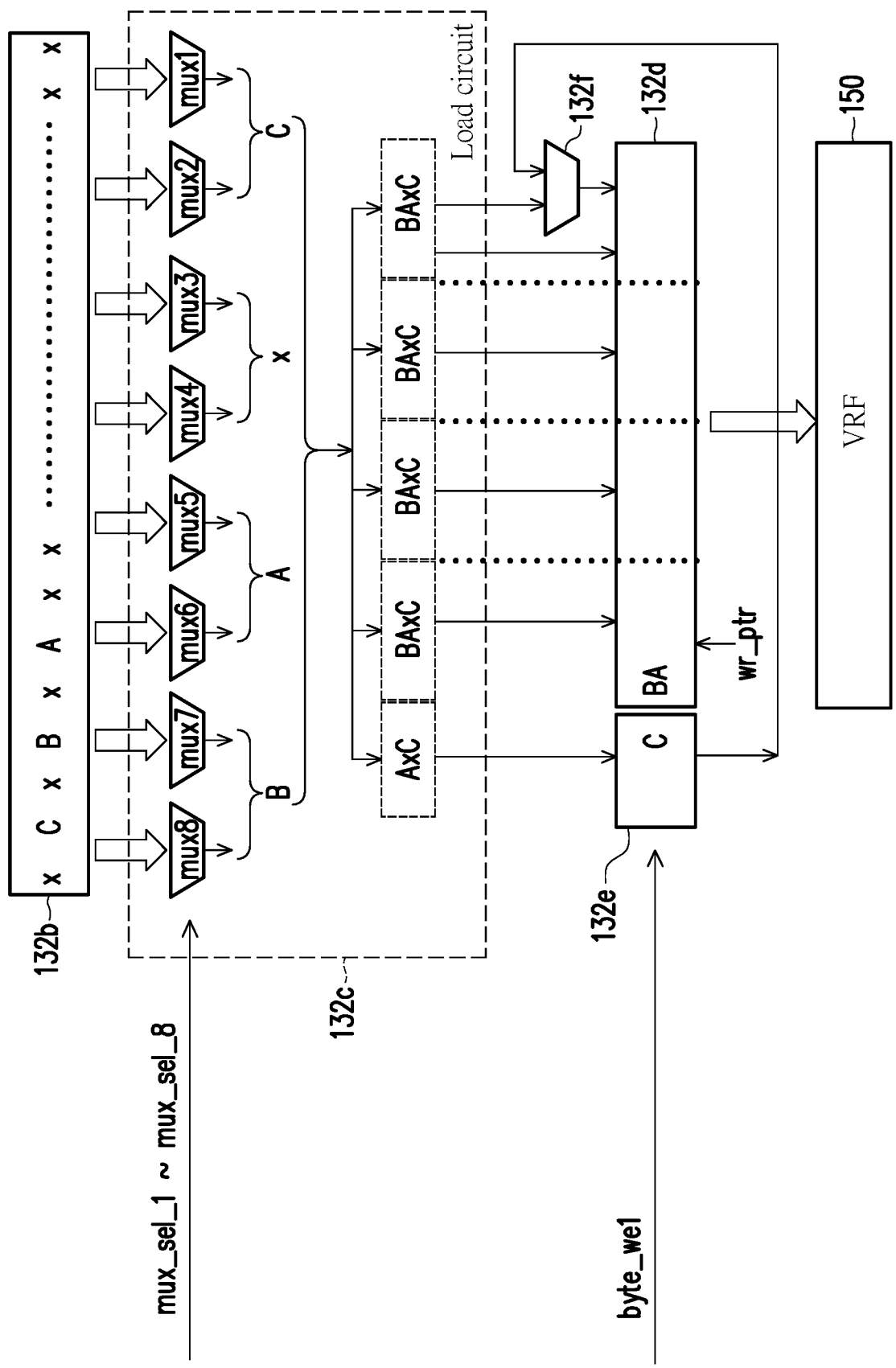
FIG. 6 is a schematic view of a circuit block of a load-store circuit according to another embodiment of the disclosure.

FIG. 6 is a schematic view of a circuit block of the load-store circuit 132 according to another embodiment of the disclosure. In the embodiment shown in FIG. 6, the load-store circuit 132 includes a line buffer 132*b*, a load circuit 132*c*, a line buffer 132*d*, a boundary buffer 132*e*, and a multiplexer 132*f*. The description of the VRF 150 shown in FIG. 6 may be deduced from the relevant description of the VRF 150 shown in FIG. 1A, the descriptions of the line buffer 132*b*, the load circuit 132*c*, and the line buffer 132*d* shown in FIG. 6 may be deduced from the relevant descriptions of the line buffer 132*b*, the load circuit 132*c*, and the line buffer 132*d* shown in FIG. 5, and therefore no repetitive description will be provided hereinafter. The load-store circuit 132*c* shown in FIG. 6 may serve as one of many embodiments of the load circuit 132*c* shown in FIG. 5.

In the embodiment shown in FIG. 6, the load circuit 132*c* includes N multiplexers, such as multiplexers mux1, mux2, mux3, mux4, mux5, mux6, mux7, and mux8 shown in FIG. 6. Each control terminal of the multiplexers is coupled to the control circuit 132*a* to receive a corresponding one of the multiplexer select signals mux_sel_n. For instance, the multiplexer mux1 is controlled by the multiplexer select signal mux_sel_1, the multiplexer mux2 is controlled by the multiplexer select signal mux_sel_2, the multiplexer mux3 is controlled by the multiplexer select signal mux_sel_3, the multiplexer mux4 is controlled by the multiplexer select signal mux_sel_4, the multiplexer mux5 is controlled by the multiplexer select signal mux_sel_5, the multiplexer mux6 is controlled by the multiplexer select signal mux_sel_6, the multiplexer mux7 is controlled by the multiplexer select signal mux_sel_7, and the multiplexer mux8 is controlled by the multiplexer select signal mux_sel_8.

Each of the multiplexers mux1 to mux8 has M selection terminals (e.g., acting as input terminals) and a common terminal (e.g., acting as an output terminal), wherein the data width of the selection terminals and the common terminal is one byte, and M is an integer determined according to the actual design and is the byte number of the line buffer 132*b*. The selection terminals of each multiplexer mux1 to mux8 are coupled to the line buffer 132*b* to receive the byte data at different locations. The control circuit 132*a* may rotate the offset values offn (e.g., as shown in Table 1 above) based on the write pointer wr_ptr to generate the multiplexer select signals mux_sel_1 to mux_sel_8. The multiplexers mux1 to mux8 collect corresponding data elements (the first data elements) from the line buffer 132*b* based on the multiplexer select signals mux_sel_1 to mux_sel_8.

For instance, it is assumed that the byte number M of the line buffer 132*b* (or 132*d*) is 32 and N is 8, the data element length ELEN is 2 bytes, the stride ST is "0b0 . . . 000100" (in the binary format), and the current base address Ab is "0b . . . 110100" (in the binary format). Therefore, the most significant bits part MSB1 and the least significant bits part LSB1 of the current base address Ab are "0b . . . 1" and "0b10100" (i.e., 20 in decimals), respectively, and the most significant bits part MSB2 and the least significant bits part LSB2 of the stride ST are "0b0" and "0b00100" (i.e., 4 in decimals) respectively. Based on the calculation by the control circuit 132*a*, the offset values off1 to off8 are "20", "21", "24", "25", "28", "29", "0", and "1" in decimals. It is further assumed that the write pointer wr_ptr is 28. Based on the write pointer wr_ptr, the control circuit 132*a* may rotate the offset values off1 to off8, so that the multiplexer select signals mux_sel_1 to mux_sel_8 are "28", "29", "0", "1", "20", "21", "24", and "25" in decimals. In the operation scenario shown in FIG. 6, one data element is assumed to be 2 bytes; however, in other operation scenarios, one data element may have other widths. In FIG. 6, the data elements at the offset "28" and "29" in the line buffer are marked as "C", the data elements at the offset "0" and "1" in the line buffer are marked as "x", the data elements at the offset "20" and "21" in the line buffer are marked as "A", the data elements at the offset "24" and "25" in the line buffer are marked as "B". The "x" in FIG. 6" indicates non-target data. Therefore, based on the multiplexer select signals mux_sel_1 to mux_sel_8, the first data elements collected by the multiplexers mux1 to mux8 from the line buffer 132*b* are "C", "x", "A", and "B" in sequence. The line buffer 132*d* includes a plurality of segments, and the data width of each of the segments is N bytes. The outputs of the common terminals of the multiplexers mux1 to mux8 are duplicated to each segment.

In the embodiment shown in FIG. 6, the load-store circuit 132 further includes a boundary buffer 132*e* and a multiplexer 132*f*. The boundary buffer 132*e* is coupled to the load circuit 132*c*. When data elements of a previous iteration prior to the current iteration (third data elements) are written near a high boundary of the line buffer 132*d*, such that a remainder of the third data elements exceeds the high boundary, the boundary buffer 132*e* may store the remainder of the previous iteration. The byte width of the boundary buffer 132*e* may be determined according to the actual design. For instance, it is assumed that the number N of the strided addresses {Cn,OFFn} is 8, and the byte width of the boundary buffer 132*e* may be 7 bytes to store the remainder of the previous iteration.

A first input terminal of the multiplexer 132f is coupled to the load circuit 132c to receive a portion of the first data elements of the current iteration. A second input terminal of the multiplexer 132f is coupled to the boundary buffer 132e to receive the remainder of the previous iteration. An output terminal of the multiplexer 132f is coupled to the line buffer 132d. When the boundary buffer 132e has a remainder, the multiplexer 132f selects the remainder of the previous iteration to the low boundary of the line buffer 132d. When the boundary buffer 132e has no remainder, the multiplexer 132f selects the portion of the first data elements to the low boundary of the line buffer 132d.

The scenario shown in FIG. 6 is taken as an example. The data elements "C", "B", and "A" are written near the high boundary of the line buffer 132d, and the remainder "C" exceeds the high boundary, thus the remainder "C" is stored in the boundary buffer 132e. When entering the next iteration, the remainder "C" in the boundary buffer 132e may be written to the low boundary of the line buffer 132d through the multiplexer 132f. The line buffer 132d may decide whether to refuse to write the data elements provided by the load circuit 132c into the line buffer 132d based on the byte-write-enable signal byte_we1. For instance, it is assumed that the overflow bits ovr8 to ovr1 are "11000000", the number N of the strided addresses {Cn,OFFn} is 8, the byte number M of the line buffer 132b (or 132d) is 32, the byte width of the boundary buffer 132e is 7 bytes, and the write pointer wr_ptr is 28. Therefore, the byte-write-enable signal byte_we1 has 39 bits, wherein 32 bits are applied to the line buffer 132d, and the remaining 7 bits are applied to the boundary buffer 132e. Based on the calculation of the control circuit 132a, the byte-write-enable signal byte_we1 is "0000011_11110 . . . 0". Therefore, the data elements "B" and "A" may be written near the high boundary of line buffer 132d, and the data element "C" may be written into the boundary buffer 132e.

At the end of the current iteration, the write pointer wr_ptr is updated to point to the new location of the line buffer 132d. For instance, the control circuit 132a may calculate wr_ptr2=wr_ptr1+Σovrbn to update the write pointer wr_ptr, where wr_ptr1 represents the current write pointer wr_ptr, and wr_ptr2 represents the new write pointer wr_ptr. The scenario shown in FIG. 6 is taken as an example. The byte_we1[33:32] (i.e., "1" and "1") of the byte-write-enable signal byte_we1 is passed to the next iteration to move the data element "C" in the boundary buffer 132e. Based on the byte_we1[38:32] of the byte-write-enable signal byte_we1 of the previous iteration, in the next iteration, the remaining data element "C" of the previous iteration is written into the first byte and the second byte of the line buffer 132d. The write pointer wr_ptr is updated to "2" ((28+6)%32=2, i.e., pointing to the third byte location of the line buffer 132d) for use in the next iteration. After the line buffer 132d has been filled, the content of the line buffer 132d may be drained to the VRF 150.

Figure 7:
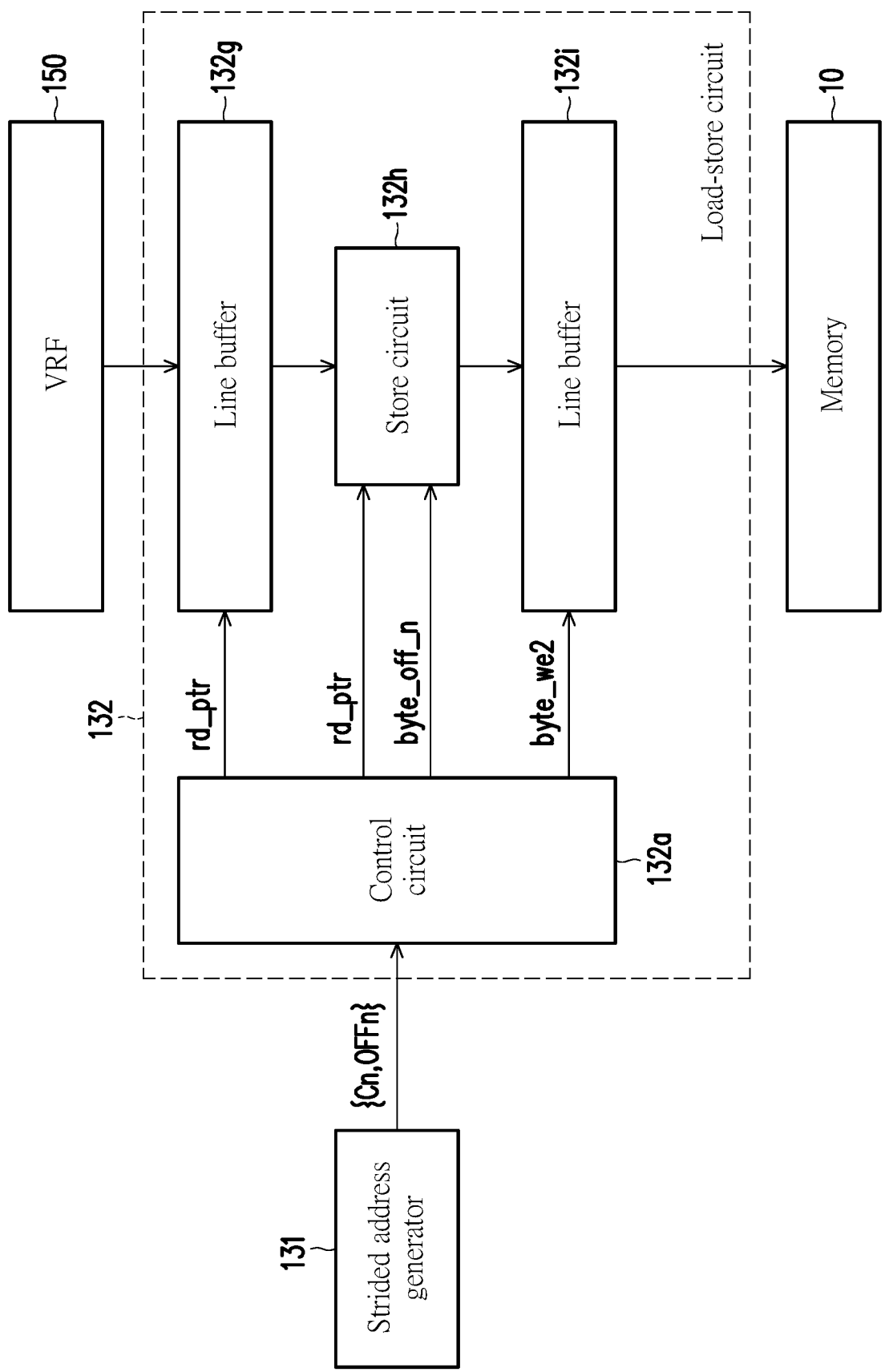
FIG. 7 is a schematic view of a circuit block of a load-store circuit according to still another embodiment of the disclosure.

FIG. 7 is a schematic view of a circuit block of the load-store circuit 132 according to still another embodiment of the disclosure. The memory 10 and the VRF 150 shown in FIG. 7 may be deduced from the relevant descriptions of the memory 10 and the VRF 150 shown in FIG. 1A, and the load-store circuit 132 shown in FIG. 7 may be deduced from the relevant description of the load-store circuit 132 shown in FIG. 4, therefore no repetitive description will be provided hereinafter. The load-store circuit 132 shown in FIG. 7 may serve as one of many embodiments of the load-store circuit 132 shown in FIG. 4.

In the embodiment shown in FIG. 7, the load-store circuit 132 includes a control circuit 132a, a line buffer 132g, a store circuit 132h, and a line buffer 132i. The line buffer 132g may read a plurality of elements from the current vector register in the VRF 150, wherein the elements include the second data elements. The width of the line buffer 132g may be determined according to the actual design. For instance, in some application scenarios, the width of the line buffer 132g may be 32 bytes (256 bits) or other widths. It is assumed that the width of the line buffer 132g is 32 bytes, and the width of the least significant bits part LSB1 of the current base address Ab and/or the width of the least significant bits part LSB2 of the stride ST may be 5 bits, so as to be adapted to the width of the line buffer 132g.

The control circuit 132a may be coupled to the strided address generator 131 to receive N strided addresses (i.e., {Cn,OFFn}, wherein n is an integer greater than 0 and less than or equal to N). The control circuit 132a may calculate OVRn=Cn|(MSB2≠0) to generate N overflow values of the current iteration (the overflow value has N bits, i.e., OVRn, wherein n is an integer greater than 0 and less than or equal to N). The control circuit 132a may select at least one bit of the overflow value based on the data element length ELEN to generate N overflow bits "ovrn". The control circuit 132a may invert the overflow bits ovrn to generate N inverted overflow bits "ovrbn". The details of the control circuit 132a for calculating the overflow value, the overflow bits ovrn, and the inverted overflow bits ovrbn may be deduced from the relevant description of the control circuit 132a shown in FIG. 5 and thus will not be further explained. The control circuit 132a may accumulate the inverted overflow bits ovrbn to generate an accumulated value. The control circuit 132a may update a read pointer rd_ptr based on the accumulated value. For instance, the control circuit 132a may calculate rd_ptr2=rd_ptr1Σovrbn to update the read pointer rd_ptr, where rd_ptr1 represents the current read pointer, and rd_ptr2 represents the new read pointer.

The store circuit 132h is coupled to the control circuit 132a to receive the read pointer rd_ptr and N shift values byte_off_n (n is an integer greater than 0 and less than or equal to N). The store circuit 132h may read the second data elements from the elements of the line buffer 132g based on the read pointer rd_ptr. The control circuit 132a may combine the n-th overflow bit ovrn with the n-th offset value offn to generate the n-th shift value byte_off_n (i.e., {ovrn,offn}) among the shift values. For instance, the control circuit 132a may combine the first overflow bit ovr1 with the first offset value off1, so that the first shift value byte_off_1 is {ovr1, off1}. The rest may be deduced therefrom; the control circuit 132a may combine the 8th overflow bit ovr8 with the 8th offset value off8, so that the 8th shift value byte_off_8 is {ovr8,off8}. The store circuit 132h has M output ports, wherein the width of each output port is 1 byte. Based on the shift values byte_off_n, the store circuit 132h may decide which output port to place a corresponding data element of the second data elements on.

The line buffer 132i is coupled to the store circuit 132h to receive the second data elements. Based on the n-th offset value offn among the offset values, the control circuit 132a may shift (e.g., shift to the left) the n-th inverted overflow bit ovrbn to generate a corresponding bit in the byte-write-enable signal byte_we2. For instance, if the overflow bit ovrn is "0" (i.e., the inversion of the ovrn is "1") and the offset value offn is 28, thus the 29th bit of the byte-write-enable signal byte_we2 (i.e., byte_we2[28]) is "1". The line buffer 132i writes the second data elements of the line buffer 132*i* into the memory 10 based on the byte-write-enable signal byte_we2 and the most significant bits part MSB1 of the current base address Ab.

Figure 8:
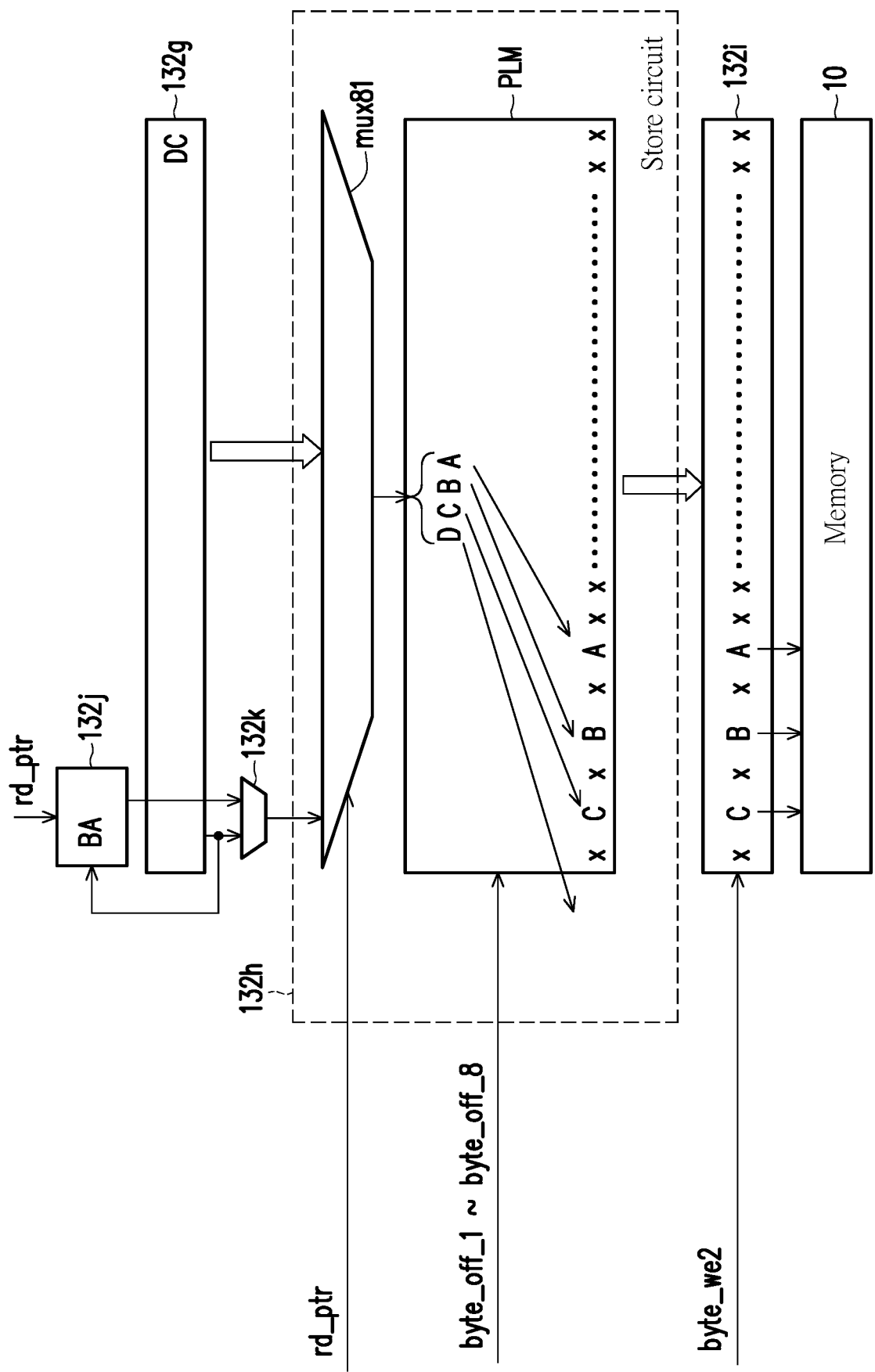
FIG. 8 is a schematic view of a circuit block of a load-store circuit according to still another embodiment of the disclosure.

FIG. 8 is a schematic view of a circuit block of the load-store circuit 132 according to still another embodiment of the disclosure. In the embodiment shown in FIG. 8, the load-store circuit 132 includes a line buffer 132*g*, a store circuit 132*h*, a line buffer 132*i*, a boundary buffer 132*j*, and a multiplexer 132*k*. The memory 10 shown in FIG. 8 may be deduced from the relevant description of the memory 10 shown in FIG. 1A, the line buffer 132*g*, the store circuit 132*h*, and the line buffer 132*i* shown in FIG. 8 may be deduced from the relevant descriptions of the line buffer 132*g*, the store circuit 132*h*, and the line buffer 132*i* shown in FIG. 7, and therefore no repetitive description will be provided hereinafter. The store circuit 132*h* shown in FIG. 8 may serve as one of many embodiments of the store circuit 132*h* shown in FIG. 7.

The boundary buffer 132*j* is coupled to the line buffer 132*g*. The boundary buffer 132*j* corresponds to the high boundary segment of the line buffer 132*g*, as shown in FIG. 8. When the read pointer rd_ptr does not point to the high boundary segment, the content of the high boundary segment is loaded to the boundary buffer 132*j*. In the operation scenario shown in FIG. 8, one data element is assumed to be 2 bytes; however, in other operation scenarios, one data element may have other widths. In FIG. 8, the data elements are labeled as "A", "B", "C", and "D". The "x" in FIG. 8 represents non-target data. The operation scenario shown in FIG. 8 is taken as an example. The data elements "A" and "B" stored in the high boundary segment of the line buffer 132*g* in the previous iteration are copied/backed up in the boundary buffer 132*j* for use in the current iteration. The first input terminal of the multiplexer 132*k* is coupled to the high boundary segment of the line buffer 132*g*. The second input terminal of the multiplexer 132*k* is coupled to the boundary buffer 132*j*. The output terminal of the multiplexer 132*k* is coupled to the store circuit 132*h*. When the read pointer rd_ptr points to the high boundary segment (as shown in FIG. 8), the multiplexer 132*k* may choose to provide the contents of the boundary buffer 132*j* to the store circuit 132*h*.

In the embodiment shown in FIG. 8, the store circuit 132*h* includes a multiplexer mux 81 and a placement circuit PLM. A control terminal of the multiplexer mux81 is coupled to the control circuit 132*a* to receive the read pointer rd_ptr. The multiplexer mux81 has M selection terminals and one common terminal, wherein M is an integer and is the byte number of the line buffer 132*g*, the data width of the selection terminals is one byte, and the data width of the common terminal is N bytes. The selection terminals of the multiplexer mux81 are coupled to the line buffer 132*g* and the multiplexer 132*k*. For instance, it is assumed that N is 8 and M is 32, the bit width of the line buffer 132*g* is 32*8=256 bits, and the bit width of the common terminal of the multiplexer mux81 is 8*8=64 bits. Based on what the byte width of the common terminal of the multiplexer mux81 is 8 bytes, the byte width of the boundary buffer 132*j* may be 7 bytes. Therefore, the highest 7 selection terminals of the multiplexer mux81 are coupled to the output terminal of the multiplexer 132*k*, and the other lower 25 selection terminals of the multiplexer mux81 are coupled to the 25 bytes of the low bit part of the line buffer 132*g*.

The multiplexer mux81 may select N consecutive bytes of the line buffer 132*g* and/or the boundary buffer 132*j*, starting from the location pointed by the read pointer rd_ptr, as the output of the multiplexer mux81. The operation scenario shown in FIG. 8 is taken as an example. It is assumed that N is 8, M is 32, the data element length ELEN is 2 bytes, and the read pointer rd_ptr is 28. The multiplexer mux81 may select 8 consecutive selection terminals, starting from the 29th selection terminal based on the read pointer rd_ptr (i.e. the 29th, 30th, 31st, 32nd, 1st, 2nd, 3rd, and 4th selection terminals), as the output of the multiplexer mux81. Therefore, the multiplexer mux 81 may output the data elements "A", "B", "C", and "D" of the line buffer 132*g* and the boundary buffer 132*j* shown in FIG. 8 to the placement circuit PLM.

The placement circuit PLM is coupled to the multiplexer mux81 to receive the output of the multiplexer mux81. The placement circuit PLM is further coupled to the control circuit 132*a* to receive a plurality of shift values, such as shift values byte_off_1 to byte_off_8 shown in FIG. 8. Based on the n-th shift value byte_off_n among the shift values byte_off_1 to byte_off_8, the placement circuit PLM may select a target byte location from the plurality of bytes of the line buffer 132*i*. The placement circuit PLM may transmit the n-th output byte corresponding to the n-th shift value byte_off_n in the output of the multiplexer mux81 to the target byte location of the line buffer 132*i*.

For instance, it is assumed that N is 8, M is 32, the data element length ELEN is 2 bytes, the read pointer rd_ptr is 28, the stride ST is "0b0 . . . 000100" (in binary), and the current base address Ab is "0b0 . . . 0110100" (in binary). Therefore, the most significant bits part MSB1 and the least significant bits part LSB1 of the current base address Ab are "0b0 . . . 01" and "0b10100" respectively, while the most significant bits part MSB2 and the least significant bits part LSB2 of the stride ST are "0b0" and "0b00100" respectively. Based on the calculation of the control circuit 132*a*, the 8 overflow bits ovr1 to ovr8 are "0", "0", "0", "0", "0", "0", "1", and "1", the 8 offset values off1*t* o off8 are "0b10100", "0b10101", "0b11000", "0b11001", "0b11100", "0b11101", "0b00000", and "0b00001" (i.e., "20", "21", "24", "25", "28", "29", "0" and "1" in decimal), and the shift values byte_off_1 to byte_off_8 are "0b0_10100", "0b0_10101", "0b0_11000", "0b0_11001", "0b0_11100", "0b0_11101", "0b1_00000", and "0b1_00001" (i.e., "20", "21", "24", "25", "28", "29", "32", and "33" in decimal). Based on the shift values byte_off_1 and byte_off_2, the placement circuit PLM may transmit the data element "A" (the 1st and 2nd output bytes in the output of the multiplexer mux81) to the 21st and 22nd bytes of the line buffer 132*i*. Based on the shift values byte_off_3 and byte_off_4, the placement circuit PLM may transmit the data element "B" (the 3rd and 4th output bytes in the output of the multiplexer mux81) to the 25th and 26th bytes of the line buffer 132*i*. Based on the shift values byte_off_5 and byte_off_6, the placement circuit PLM may transmit the data element "C" (the 5th and 6th output bytes in the output of the multiplexer mux81) to the 29th and 30th bytes of the line buffer 132*i*. Since the shift values byte_off_7 and byte_off_8 exceed the addressing range of the line buffer 132*i*, the placement circuit PLM may discard the data element "D" (the 7th and 8th output bytes in the output of the multiplexer mux81).

The line buffer 132*i* may write the second data elements of the line buffer 132*i* into the memory 10 based on the byte-write-enable signal byte_we2 and the most significant bits part MSB1 of the current base address Ab. For instance, it is assumed that N is 8, M is 32, the data element length ELEN is 2 bytes, the read pointer rd_ptr is 28, the stride ST is "0b0 . . . 000100" (in binary), and the current base address Ab is "0b . . . 0110100" (in binary). Based on the calculation of the control circuit 132*a*, the 8 overflow bits ovr1 to ovr8 are "0", "0", "0", "0", "0", "0", "1", and "1", the 8 offset values off1 to off8 are "20", "21", "24", "25", "28", "29", "0", and "1" (in decimal), and the byte-write-enable signal byte_we2 is "0b0011 0011 0011 0000 0000 0000 0000 0000" (in binary), wherein the bit value "1" means "write enabled" and "0" means "write disabled". Based on the byte-write-enable signal byte_we2 and the most significant bits part MSB1 of the current base address Ab, the line buffer 132$i$ may write the data elements "A", "B", and "C" (the second data elements) into the addresses at {MSB1,20}, {MSB1,21}, {MSB1,24}, {MSB1,25}, {MSB1,28}, and {MSB1,29} (in decimal) of the memory 100.

Figure 9:
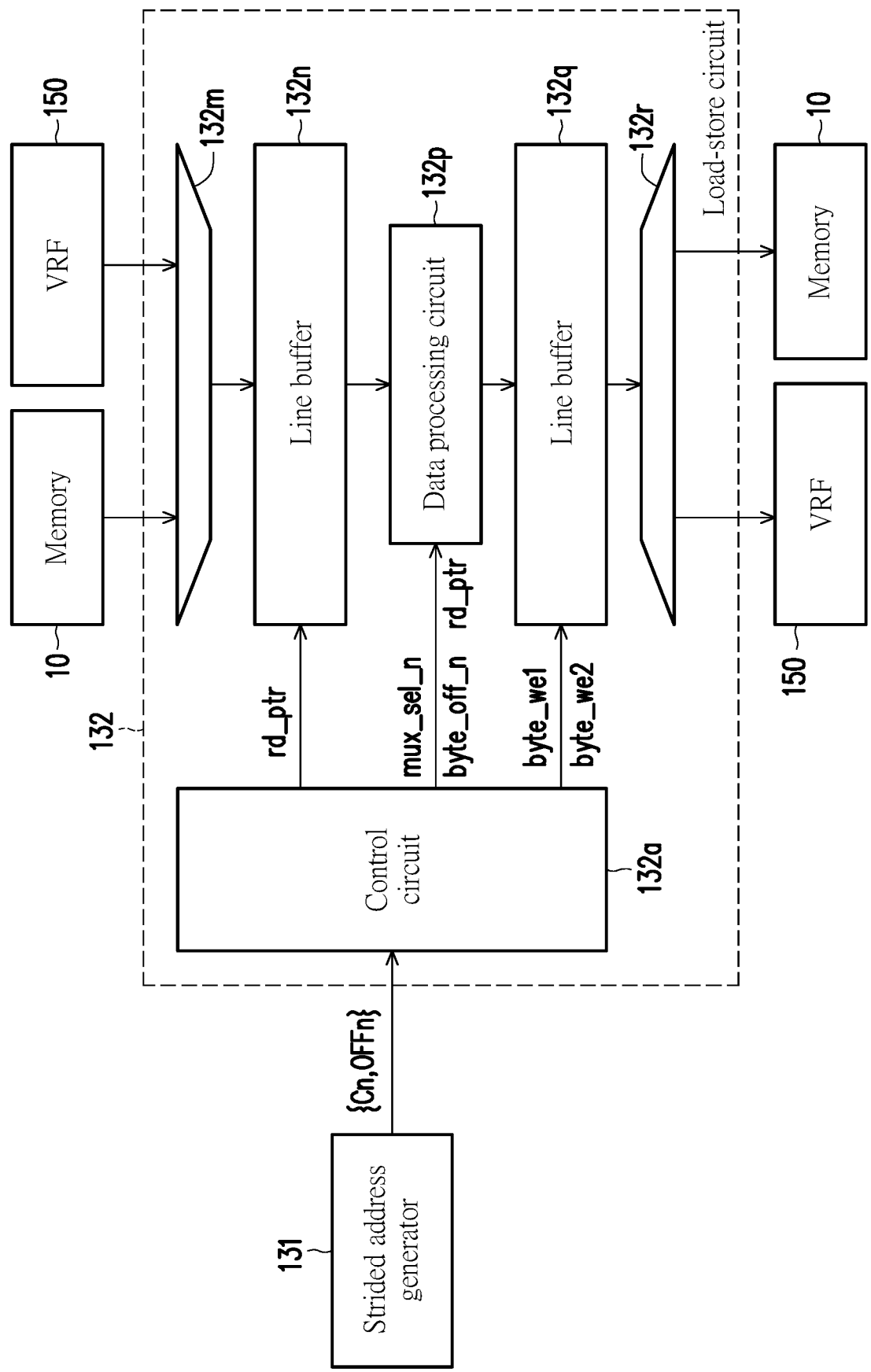
FIG. 9 is a schematic view of a circuit block of a load-store circuit according to still another embodiment of the disclosure.

FIG. 9 is a schematic view of a circuit block of the load-store circuit 132 according to still another embodiment of the disclosure. The memory 10 and the VRF 150 shown in FIG. 9 may be deduced from the relevant descriptions of the memory 10 and the VRF 150 shown in FIG. 1A, the load-store circuit 132 shown in FIG. 9 may be deduced from the relevant description of the load-store circuit 132 shown in FIG. 4, and therefore no repetitive description will be provided hereinafter. The load-store circuit 132 shown in FIG. 9 may serve as one of many embodiments of the load-store circuit 132 shown in FIG. 4.

In the embodiment shown in FIG. 9, the load-store circuit 132 includes a control circuit 132$a$, a routing circuit 132$m$, a line buffer 132$n$, a data processing circuit 132$p$, a line buffer 132$q$, and a routing circuit 132$r$. The routing circuit 132$m$ is coupled to the line buffer 132$n$. The routing circuit 132$r$ is coupled to the line buffer 132$q$. When the load-store device 130 reads a plurality of first data elements at a plurality of discrete addresses in the memory 10 (i.e., when the load-store device 130 operates in a load mode), the routing circuit 132$m$ couples the memory 10 to the line buffer 132$n$ in the load mode, and the routing circuit 132$r$ couples the VRF 150 to the line buffer 132$q$ in the load mode. When the load-store device 130 operates in the load mode, the operation of the control circuit 132$a$ shown in FIG. 9 may be deduced from the operation of the control circuit 132$a$ shown in FIG. 5 and FIG. 6, as described above, and therefore no further description is provided hereinafter. When the load-store device 130 writes a plurality of second data elements to the discrete addresses in the memory 10 (i.e., the load-store device 130 operates in a store mode), the routing circuit 132$m$ couples the VRF 150 to the line buffer 132$n$ in the store mode, and the routing circuit 132$r$ couples the memory 10 to the line buffer 132$q$ in the store mode. When the load-store device 130 operates in the store mode, the operation of the control circuit 132$a$ shown in FIG. 9 may be deduced from the operation of the control circuit 132$a$ shown in FIG. 7 and FIG. 8, as described above, and therefore no further description is provided hereinafter.

When the memory 10 is coupled to the line buffer 132$n$ (in the load mode), the line buffer 132$n$ may read the bytes at the discrete addresses from the memory 10 based on the most significant bits part MSB1 of the current base address Ab in the current iteration. At this time, the operation of the line buffer 132$n$ shown in FIG. 9 may be deduced from the operation of the line buffer 132$b$ shown in FIG. 5 or the operation of the line buffer 132$b$ shown in FIG. 6, as described above, and therefore no further description is provided hereinafter. The data processing circuit 132$p$ is coupled to the control circuit 132$a$ to receive N multiplexer select signals mux_sel_n, N shift values byte_off_n, and the read pointer rd_ptr. In the load mode, the data processing circuit 132$p$ may collect the first data elements from the bytes of the line buffer 132$n$ based on the multiplexer select signal mux_sel_n. At this time, the operation of the data processing circuit 132$p$ shown in FIG. 9 may be deduced from the operation of the load circuit 132$c$ shown in FIG. 5 or FIG. 6, as described above, and therefore no further description is provided hereinafter.

The line buffer 132$q$ is coupled to the data processing circuit 132$p$ to receive the first data elements in the load mode. In the load mode, the line buffer 132$q$ determines which byte locations of the line buffer 132$q$ to write the first data elements based on the byte-write-enable signal byte_we1. At this time, the operation of the line buffer 132$q$ shown in FIG. 9 may be deduced from the operation of the line buffer 132$d$ shown in FIG. 5, or the operations of the line buffer 132$d$, the boundary buffer 132$e$, and the multiplexer 132$f$ shown in FIG. 6, as described above, and therefore no further description is provided hereinafter.

When the VRF 150 is coupled to the line buffer 132$n$ (in the store mode), the line buffer 132$n$ reads a plurality of elements from the current vector register of the VRF 150. At this time, the operation of the line buffer 132$n$ shown in FIG. 9 may be deduced from the operation of the line buffer 132$g$ shown in FIG. 7, or the operations of the line buffer 132$g$, the boundary buffer 132$j$, and the multiplexer 132$k$ shown in FIG. 8, as described above, and therefore no further description is provided hereinafter. In the store mode, the data processing circuit 132$p$ may read the second data elements from the line buffer 132$n$ based on the read pointer rd_ptr. At this time, the operation of the data processing circuit 132$p$ shown in FIG. 9 may be deduced from the operation of the store circuit 132$h$ shown in FIG. 7 or FIG. 8, as described above, and therefore no further description is provided hereinafter.

The line buffer 132$q$ is coupled to the data processing circuit 132$p$ to receive the second data elements in the store mode. In the store mode, the line buffer 132$q$ determines which byte locations of the line buffer 132$q$ to write the second data elements based on the byte-write-enable signal byte_we2. At this time, the operation of the line buffer 132$q$ shown in FIG. 9 may be deduced from the operation of the line buffer 132$i$ shown in FIG. 7 or FIG. 8, as described above, and therefore no further description is provided hereinafter.

According to various design requirements, the load-store device 130, the strided address generator 131, the load-store circuit 132, the control circuit 132$a$, the load circuit 132$c$, the store circuit 132$h$, and/or the data processing circuit 132$p$ may be implemented in form of hardware, firmware, or a combination thereof. In terms of hardware, the load-store device 130, the strided address generator 131, the load-store circuit 132, the control circuit 132$a$, the load circuit 132$c$, the store circuit 132$h$, and/or the data processing circuit 132$p$ may be implemented in form of a logic circuit on an integrated circuit. The relevant functions of the load-store device 130, the strided address generator 131, the load-store circuit 132, the control circuit 132$a$, the load circuit 132$c$, the store circuit 132$h$, and/or the data processing circuit 132$p$ may be implemented in form of hardware by applying hardware description languages (e.g., Verilog HDL or VHDL) or other appropriate programming languages. For instance, the relevant functions of load-store device 130, the strided address generator 131, the load-store circuit 132, the control circuit 132$a$, the load circuit 132$c$, the store circuit 132$h$ and/or the data processing circuit 132$p$ may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A processor adapted to access a memory and comprising:
a vector register file; and
a load-store logic circuit coupled to the vector register file and configured to perform a first strided operation and a second strided operation on the memory, wherein the load-store logic circuit reads a plurality of first data elements at a first plurality of discrete addresses in the memory and writes the first data elements into the vector register file in a current iteration of the first strided operation, and the load-store logic circuit reads a plurality of second data elements from the vector register file and respectively writes the second data elements into a second plurality of discrete addresses in the memory in a current iteration of the second strided operation,
wherein the load-store logic circuit comprises:
a strided address logic circuit generating a plurality of strided addresses based on a least significant bits part of a current base address and a stride, wherein each of the plurality of strided addresses has a carry part and an offset part, the strided address logic circuit calculates $\{Cn,OFFn\}=(LSB1+LSB2*(n-1))$ to generate an n-th strided address $\{Cn,OFFn\}$ among N of the plurality of strided addresses, the N of the plurality of strided addresses are used for the current iteration of the first strided operation or the second strided operation, N is an integer, n is an integer greater than 0 and less than or equal to N, LSB2 is a least significant bits part of the stride, LSB1 is a least significant bits part of the current base address, OFFn is the offset part of the n-th strided address, and Cn is the carry part of the n-th strided address; and
a load-store circuit coupled to the strided address logic circuit to receive the plurality of strided addresses, wherein the load-store circuit comprises:
a first line buffer configured to read a plurality of bytes at the first plurality of discrete addresses from the memory based on a most significant bits part of the current base address in the current iteration of the first strided operation, wherein the bytes comprise the first data elements;
a control circuit coupled to the strided address logic circuit to receive the plurality of strided addresses, wherein the control circuit selects at least one of the offset parts of the plurality of strided addresses based on a data element length to generate N offset values, and the control circuit rotates the offset values based on a write pointer to generate N multiplexer select signals; and
a load circuit coupled to the control circuit to receive the multiplexer select signals and configured to collect the first data elements from the bytes of the first line buffer based on the multiplexer select signals.

2. The processor according to claim 1, wherein the load-store circuit reads the first data elements in the memory based on a most significant bits part of the current base address and the stride and writes the first data elements into the vector register file, or the load-store circuit reads the second data elements from the vector register file and respectively writes the second data elements into the memory based on the most significant bits part of the current base address and the stride.

3. The processor according to claim 2, wherein the load-store circuit comprises:
the first line buffer configured to read a plurality of elements from a current vector register in the vector register file, wherein the plurality of elements read from the current vector register comprise the second data elements;
the control circuit coupled to the strided address logic circuit to receive the plurality of strided addresses, wherein the control circuit calculates $OVRn=(Cn|(MSB2\neq0))$ to generate an n-th bit of an overflow value of the current iteration of the first strided operation or the second strided operation, the overflow value has N bits, MSB2 is a most significant bits part of the stride, an operator | is an OR operation, OVRn is an n-th bit of the overflow value, the control circuit selects at least one bit of the overflow value based on a data element length to generate N overflow bits, the control circuit inverts the overflow bits to generate N inverted overflow bits, and the control circuit accumulates the inverted overflow bits to generate an accumulated value; and
a store circuit coupled to the control circuit to receive a read pointer and configured to read the second data elements from the plurality of elements of the first line buffer based on the read pointer,
wherein the control circuit updates the read pointer based on the accumulated value.

4. The processor according to claim 3, wherein the load-store circuit further comprises:
a boundary buffer coupled to the first line buffer, wherein the boundary buffer corresponds to a high boundary segment of the first line buffer, and when the read pointer does not point at the high boundary segment, contents of the high boundary segment are loaded to the boundary buffer, and
a multiplexer having a first input terminal coupled to the high boundary segment of the first line buffer, a second input terminal coupled to the boundary buffer, and an output terminal coupled to the store circuit, wherein when the read pointer points to the high boundary segment, the multiplexer provides the contents of the boundary buffer to the store circuit.

5. The processor according to claim 3, wherein the load-store circuit further comprises:
a second line buffer coupled to the store circuit to receive the second data elements;
wherein the control circuit selects at least one of the offset parts of the plurality of strided addresses to generate N offset values based on the data element length, the control circuit shifts an n-th inverted overflow bit of the inverted overflow bits based on an n-th offset value of the offset values to generate a corresponding bit in a byte-write-enable signal, and the second line buffer writes the second data elements of the second line buffer into the memory based on the byte-write-enable signal and a most significant bits part of the current base address.

6. The processor according to claim 5, wherein the store circuit comprises:

a multiplexer, wherein a control terminal of the multiplexer is coupled to the control circuit to receive the read pointer, the multiplexer has M selection terminals and a common terminal, M is an integer and is a byte number of the first line buffer, a data width of any of the M selection terminals is one byte, a data width of the common terminal is N bytes, the selection terminals of the multiplexer are coupled to the first line buffer, and the multiplexer selects consecutive N bytes of the first line buffer from a location pointed by the read pointer as an output of the multiplexer; and a placement circuit coupled to the multiplexer to receive the output of the multiplexer and coupled to the control circuit to receive a plurality of shift values, wherein the placement circuit selects a target byte location from a plurality of bytes of the second line buffer based on an n-th shift value of the shift values, and the placement circuit transmits the n-th output byte corresponding to an n-th shift value in the output of the multiplexer to the target byte location.

7. The processor according to claim 6, wherein the control circuit selects at least one of the offset parts of the plurality of strided addresses based on the data element length to generate the N offset values, and the control circuit combines an n-th overflow bit of the overflow bits and the n-th offset value of the N offset values to generate the n-th shift value of the shift values.

8. The processor according to claim 2, wherein the load-store circuit comprises:
the first line buffer;
a first routing circuit coupled to the first line buffer, wherein the first routing circuit couples the memory to the first line buffer in a load mode, when in the load mode, the first line buffer reads a plurality of bytes at the first plurality of discrete addresses from the memory which is pointed by a most significant bits part of the current base address in the current iteration of the first strided operation; the first routing circuit couples the vector register file to the first line buffer in a store mode, and when in the store mode, the first line buffer reads a plurality of elements from a current vector register in the vector register file;
the control circuit coupled to the strided address logic circuit to receive the plurality of strided addresses, wherein the control circuit selects at least one of the offset parts of the plurality of strided addresses based on a data element length to generate N offset values, the control circuit rotates the offset values based on a write pointer to generate N multiplexer select signals, the control circuit calculates OVRn=(Cn|(MSB2≠0)) to generate an n-th bit of an overflow value of the current iteration, the overflow value has N bits, MSB2 is a most significant bits part of the stride, an operator|is an OR operation, OVRn is an n-th bit of the overflow value, the control circuit selects at least one bit of the overflow value based on the data element length to generate N overflow bits, the control circuit inverts the overflow bits to generate N inverted overflow bits, and the control circuit accumulates the inverted overflow bits to generate an accumulated value;
a data processing circuit coupled to the control circuit to receive the multiplexer select signals and a read pointer, wherein the data processing circuit collects the first data elements from the first line buffer based on the multiplexer select signals in the load mode, and the data processing circuit reads the second data elements from the first line buffer based on the read pointer in the store mode;
a second line buffer coupled to the data processing circuit to receive the first data elements or the second data elements, wherein the control circuit shifts the inverted overflow bits based on the write pointer to generate a first byte-write-enable signal in the load mode, the second line buffer determines which bytes location of the second line buffer are written with the first data elements based on the first byte-write-enable signal in the load mode, the control circuit shifts the n-th inverted overflow bit of the inverted overflow bits based on an n-th offset value of the offset values to generate a corresponding bit in a second byte-write-enable signal in the store mode, and the second line buffer writes the second data elements of the second line buffer into the memory based on the second byte-write-enable signal and the most significant bits part of the current base address in the store mode; and
a second routing circuit coupled to the second line buffer, wherein the second routing circuit couples the vector register file to the second line buffer in the load mode, and the second routing circuit couples the memory to the second line buffer in the store mode, wherein the control circuit updates the read pointer based on the accumulated value.

9. The processor according to claim 1, wherein the load-store circuit further comprises:
a second line buffer coupled to the load circuit to receive the first data elements;
wherein the control circuit calculates OVRn=(Cn|(MSB2≠0)) to generate an n-th bit of an overflow value in the current iteration of the first strided operation or the second strided operation, the overflow value has N bits, MSB2 is a most significant bits part of the stride, an operator|is an OR operation, OVRn is an n-th bit of the overflow value, the control circuit selects at least one bit of the overflow value based on the data element length to generate N overflow bits, the control circuit inverts the overflow bits to generate N inverted overflow bits, the control circuit shifts the inverted overflow bits based on the write pointer to generate a byte-write-enable signal, and the second line buffer determines byte locations of the second line buffer where the first data elements are written based on the byte-write-enable signal.

10. The processor according to claim 9, wherein the load circuit comprises:
N multiplexers, wherein each of the multiplexers has a control terminal, a common terminal and M selection terminals, each control terminal of the multiplexers is coupled to the control circuit to receive a corresponding multiplexer select signal of the multiplexer select signals, a data width of any of the M selection terminals and the common terminals is one byte, M is an integer and is a byte number of the first line buffer, the selection terminals of each of the multiplexers are coupled to the first line buffer to receive the bytes, the second line buffer comprises a plurality of segments, a data width of each of the segments is N bytes, and outputs of the common terminals of the multiplexers are duplicated to each of the segments.

11. The processor according to claim 9, wherein the load-store circuit further comprises:
a boundary buffer coupled to the load circuit, wherein when a plurality of third data elements of a previous iteration prior to the current iteration are written to a high boundary of the second line buffer such that a remainder of the third data elements exceeds the high boundary, the boundary buffer is configured to store the remainder of the previous iteration; and a multiplexer having a first input terminal coupled to the load circuit to receive a portion of the first data elements of the current iteration, wherein a second input terminal of the multiplexer is coupled to the boundary buffer to receive the remainder of the previous iteration, and an output terminal of the multiplexer is coupled to the second line buffer, wherein the multiple xer writes the remainder of the previous iteration into a low boundary of the second line buffer when the boundary buffer has the remainder, and the multiplexer writes the portion of the first data elements into the low boundary of the second line buffer when the boundary buffer does not have the remainder.

12. An operating method of a processor, the operating method comprising:

performing one of a first strided operation and a second strided operation on a memory by a load-store logic circuit;

in a current iteration of the first strided operation, reading a plurality of first data elements at a first plurality of discrete addresses in the memory by the load-store logic circuit and writing the first data elements into a vector register file;

in a current iteration of the second strided operation, reading a plurality of second data elements from the vector register file by the load-store logic circuit and respectively writing the second data elements into a second plurality of discrete addresses in the memory;

generating a plurality of strided addresses by a strided address logic circuit based on a least significant bits part of a current base address and a stride, wherein each of the plurality of strided addresses has a carry part and an offset part;

calculating $\{C_n, OFF_n\} = (LSB1 + LSB2 \cdot (n-1))$ to generate an n-th strided address $\{C_n, OFF_n\}$ among N of the plurality of strided addresses by the strided address logic circuit, the N of the plurality of strided addresses are used for the current iteration, wherein N is an integer, n is an integer greater than 0 and less than or equal to N, LSB2 is a least significant bits part of the stride, LSB1 is a least significant bits part of the current base address, $OFF_n$ is the offset part of the n-th strided address, and $C_n$ is the carry part of the n-th strided address;

reading a plurality of bytes at the first plurality of discrete addresses from the memory based on a most significant bits part of the current base address in the current iteration by a first line buffer of a load-store circuit of the load-store logic circuit, wherein the bytes comprise the first data elements;

selecting at least one of the offset parts of the plurality of strided addresses based on a data element length to generate N offset values by a control circuit of the load-store circuit;

rotating the offset values based on a write pointer to generate N multiplexer select signals by the control circuit; and collecting the first data elements from the first line buffer by a load circuit of the load-store circuit based on the multiplexer select signals.

13. The operating method according to claim 12, further comprising:

reading the first data elements in the memory by the load-store circuit of the load-store logic circuit based on a most significant bits part of the current base address and the stride and writing the first data elements into the vector register file, or reading the second data elements from the vector register file by the load-store circuit and respectively writing the second data elements into the memory based on the most significant bits part of the current base address and the stride.

14. The operating method according to claim 13, further comprising:

reading a plurality of elements from a current vector register of the vector register file by the first line buffer of the load-store circuit, wherein the plurality of elements read from the current vector register comprise the second data elements;

calculating $OVR_n = (C_n | (MSB2 \neq 0))$ to generate an n-th bit of an overflow value of the current iteration by the control circuit of the load-store circuit, wherein the overflow value has N bits, MSB2 is a most significant bits part of the stride, an operator | is an OR operation, and $OVR_n$ is an n-th bit of the overflow value;

selecting at least one bit of the overflow value to generate N overflow bits by the control circuit based on a data element length;

inverting the overflow bits to generate N inverted overflow bits by the control circuit and accumulating the inverted overflow bits to generate an accumulated value by the control circuit;

reading the second data elements from the elements of the first line buffer by a store circuit of the load-store circuit based on the read pointer; and updating the read pointer by the control circuit based on the accumulated value.

15. The operating method according to claim 14, further comprising:

selecting at least one of the offset parts of the plurality of strided addresses to generate N offset values by the control circuit of the load-store circuit based on the data element length;

shifting an n-th inverted overflow bit of the inverted overflow bits to generate a corresponding bit in a byte-write-enable signal by the control circuit based on an n-th offset value of the offset values; and writing the second data elements of the second line buffer into the memory by a second line buffer of the load-store circuit based on the byte-write-enable signal and a most significant bits part of the current base address.

16. The operating method according to claim 13, further comprising:

coupling the memory with the first line buffer of the load-store circuit by a first routing circuit of the load-store circuit in a load mode, when the memory is coupled to the first line buffer, reading a plurality of bytes at the first plurality of discrete addresses from the memory by the first line buffer based on a most significant bits part of the current base address in the current iteration;

coupling the vector register file with the first line buffer by the first routing circuit in a store mode;

when the vector register file is coupled to the first line buffer, reading a plurality of elements from a current vector register of the vector register file by the first line buffer;

selecting at least one of the offset parts of the plurality of strided addresses to generate N offset values by the control circuit of the load-store circuit based on a data element length;

rotating the offset values to generate N multiplexer select signals by the control circuit based on a write pointer;

calculating $OVRn=(Cn|(MSB2\neq 0))$ to generate an n-th bit of an overflow value of the current iteration by the control circuit, wherein the overflow value has N bits, MSB2 is a most significant bits part of the stride, an operator|is an OR operation, and OVRn is an n-th bit of the overflow value;

selecting at least one bit of the overflow value to generate N overflow bits by the control circuit based on the data element length;

inverting the overflow bits to generate N inverted overflow bits by the control circuit;

accumulating the inverted overflow bits to generate an accumulated value by the control circuit;

shifting the inverted overflow bits to generate a first byte-write-enable signal by the control circuit based on the write pointer in the load mode;

shifting the n-th inverted overflow bit of the inverted overflow bits to generate a corresponding bit in a second byte-write-enable signal by the control circuit based on an n-th offset value of the offset values in the store mode;

collecting the first data elements from the bytes of the first line buffer by a data processing circuit of the load-store circuit based on the multiplexer select signals in the load mode;

reading the second data elements from the elements of the first line buffer by the data processing circuit based on the read pointer in the store mode;

determining the byte locations of the second line buffer where the first data elements are written by a second line buffer of the load-store circuit based on the first byte-write-enable signal in the load mode;

writing the second data elements of the second line buffer into the memory by the second line buffer based on the second byte-write-enable signal and the most significant bits part of the current base address in the store mode;

coupling the vector register file with the second line buffer by a second routing circuit of the load-store circuit in the load mode;

coupling the memory with the second line buffer by the second routing circuit in the store mode; and updating the read pointer by the control circuit based on the accumulated value.

17. The operating method according to claim 12, further comprising:

calculating $OVRn=(Cn|(MSB2\neq 0))$ to generate an n-th bit of an overflow value of the current iteration by the control circuit, wherein the overflow value has N bits, MSB2 is a most significant bits part of the stride, an operator|is an OR operation, and OVRn is an n-th bit of the overflow value;

selecting at least one bit of the overflow value based on the data element length to generate N overflow bits by the control circuit;

inverting the overflow bits to generate N inverted overflow bits by the control circuit;

shifting the inverted overflow bits based on the write pointer to generate a byte-write-enable signal by the control circuit; and determining the bytes locations of the second line buffer where the first data elements are written based on the byte-write-enable signal by a second line buffer of the load-store circuit.

18. A load-store device comprising:

a strided address generator generating a plurality of strided addresses based on a least significant bits part of a current base address and a least significant bits part of a stride, wherein each of the plurality of strided addresses has a carry part and an offset part, the strided address generator calculates $\{Cn,OFFn\}=(LSB1+LSB2*(n-1))$ to generate an n-th strided address $\{Cn, OFFn\}$ among N of the plurality of strided addresses, the N of the plurality of strided addresses are used for a current iteration of a strided operation, N is an integer, n is an integer greater than 0 and less than or equal to N, LSB2 is the least significant bits part of the stride, LSB1 is the least significant bits part of the current base address, OFFn is the offset part of the n-th strided address, and Cn is the carry part of the n-th strided address, wherein the LSB1 and the LSB2 are the only parts of the current based address and stride that the strided address generator uses to generate the n-th stride address; and a load-store circuit coupled to the strided address generator to receive the plurality of strided addresses, wherein the load-store circuit reads a plurality of first data elements in a memory based on a most significant bits part of the current base address and the stride and writes the first data elements into a vector register file, the load-store circuit reads a plurality of second data elements from the vector register file and respectively writes the second data elements into the memory based on the most significant bits part of the current base address and the stride, and the load-store circuit comprises:

a first line buffer configured to read a plurality of bytes at a plurality of discrete addresses from the memory based on a most significant bits part of the current base address in the current iteration, wherein the bytes comprise the first data elements;

a control circuit coupled to the strided address generator to receive the plurality of strided addresses, wherein the control circuit selects at least one of the offset parts of the plurality of strided addresses to generate N offset values based on a data element length, and the control circuit rotates the offset values to generate N multiplexer select signals based on a write pointer; and a load circuit coupled to the control circuit to receive the multiplexer select signals and configured to collect the first data elements from the bytes of the first line buffer based on the multiplexer select signals.

19. The load-store device according to claim 18, wherein the load-store circuit further comprises:

a second line buffer coupled to the load circuit to receive the first data elements, wherein the control circuit calculates $OVRn=(Cn|(MSB2\neq 0))$ to generate an n-th bit of an overflow value in the current iteration, the overflow value has N bits, MSB2 is a most significant bits part of the stride, an operator|is an OR operation, OVRn is an n-th bit of the overflow value, the control circuit selects at least one bit of the overflow value to generate N overflow bits based on the data element length, the control circuit inverts the overflow bits to generate N inverted overflow bits, the control circuit shifts the inverted overflow bits to generate a byte-write-enable signal based on the write pointer, and the second line buffer determines the byte locations of the second line buffer where the first data elements are written based on the byte-write-enable signal.

20. The load-store device according to claim 19, wherein the load-circuit comprises:
N multiplexers, wherein each of the multiplexers has a control terminal, a common terminal and M selection terminals, each control terminal of the multiplexers is coupled to the control circuit to receive a corresponding one of the multiplexer select signals, a data width of the M selection terminals and the common terminals is one byte, M is an integer and is a byte number of the first line buffer, the selection terminals of the multiplexers are coupled to the first line buffer to receive the bytes, the second line buffer comprises a plurality of segments, a data width of each of the segments is N bytes, and outputs of the common terminals of the multiplexers are duplicated to each of the segments.

21. The load-store device according to claim 19, wherein the load-store circuit further comprises:
a boundary buffer coupled to the load circuit, wherein when a plurality of third data elements of a previous iteration prior to the current iteration are written to a high boundary of the second line buffer such that a remainder of the third data elements exceeds the high boundary, the boundary buffer is configured to store the remainder of the previous iteration; and
a multiplexer having a first input terminal coupled to the load circuit to receive a portion of the first data elements of the current iteration, a second input terminal coupled to the boundary buffer to receive the remainder of the previous iteration, and an output terminal coupled to the second line buffer, wherein the multiplexer writes the remainder of the previous iteration into a low boundary of the second line buffer when the boundary buffer has the remainder, and the multiplexer writes the portion of the first data elements into the low boundary of the second line buffer when the boundary buffer does not have the remainder.

22. The load-store device according to claim 18, wherein the load-store circuit comprises:
the first line buffer configured to read a plurality of elements from a current vector register in the vector register file, wherein the plurality of elements read from the current vector register comprise the second data elements;
the control circuit coupled to the strided address generator to receive the plurality of strided addresses, wherein the control circuit calculates OVRn=(Cn|(MSB2≠0)) to generate an n-th bit of an overflow value of the current iteration, the overflow value has N bits, MSB2 is a most significant bits part of the stride, an operator|is an OR operation, OVRn is an n-th bit of the overflow value, the control circuit selects at least one bit of the overflow value based on a data element length to generate N overflow bits, the control circuit inverts the overflow bits to generate N inverted overflow bits, and the control circuit accumulates the inverted overflow bits to generate an accumulated value; and
a store circuit coupled to the control circuit to receive a read pointer and configured to read the second data elements from the plurality of elements of the first line buffer based on the read pointer, wherein the control circuit updates the read pointer based on the accumulated value.

23. The load-store device according to claim 22, wherein the load-store circuit further comprises:
a boundary buffer coupled to the first line buffer, wherein the boundary buffer corresponds to a high boundary segment of the first line buffer, and when the read pointer does not point to the high boundary segment, contents of the high boundary segment are loaded to the boundary buffer, and
a multiplexer having a first input terminal coupled to the high boundary segment of the first line buffer, a second input terminal coupled to the boundary buffer, and an output terminal coupled to the store circuit, wherein when the read pointer points to the high boundary segment, the multiplexer provides the contents of the boundary buffer to the store circuit.

24. The load-store device according to claim 22, wherein the load-store circuit further comprises:
a second line buffer coupled to the store circuit to receive the second data elements;
wherein the control circuit selects at least one of the offset parts of the plurality of strided addresses based on the data element length to generate N offset values, the control circuit shifts an n-th inverted overflow bit of the inverted overflow bits based on an n-th offset value of the offset values to generate a corresponding bit in a byte-write-enable signal, and the second line buffer writes the second data elements of the second line buffer into the memory based on the byte-write-enable signal and a most significant bits part of the current base address.

25. The load-store device according to claim 24, wherein the store circuit comprises:
a multiplexer, wherein a control terminal of the multiplexer is coupled to the control circuit to receive the read pointer, the multiplexer has M selection terminals and a common terminal, M is an integer and is a byte number of the first line buffer, a data width of the M selection terminals is one byte, a data width of the common terminal is N bytes, the selection terminals of the multiplexer are coupled to the first line buffer, and the multiplexer selects consecutive N bytes of the first line buffer from a location pointed by the read pointer as an output of the multiplexer, and
a placement circuit coupled to the multiplexer to receive the output of the multiplexer and coupled to the control circuit to receive a plurality of shift values, wherein the placement circuit selects a target byte location from a plurality of bytes of the second line buffer based on an n-th shift value of the shift values, and the placement circuit transmits an n-th output byte corresponding to the n-th shift value in the output of the multiplexer to the target byte location.

26. The load-store device according to claim 25, wherein the control circuit selects at least one of the offset parts of the plurality of strided addresses based on the data element length to generate the N offset values, and the control circuit combines an n-th overflow bit of the overflow bits and the n-th offset value of the N offset values to generate the n-th shift value of the shift values.

27. The load-store device according to claim 18, wherein the load-store circuit comprises:
the first line buffer;
a first routing circuit coupled to the first line buffer, wherein the first routing circuit couples the memory to the first line buffer in a load mode, when in the load mode, the first line buffer reads the plurality of bytes at the plurality of discrete addresses from the memory based on a most significant bits part of the current base address in the current iteration, the first routing circuit couples the vector register file to the first line buffer in a store mode, and when in the store mode, the first line buffer reads a plurality of elements from a current vector register in the vector register file;

the control circuit coupled to the strided address generator to receive the plurality of strided addresses, wherein the control circuit selects at least one of the offset parts of the plurality of strided addresses based on a data element length to generate N offset values, and the control circuit rotates the offset values based on a write pointer to generate N multiplexer select signals, the control circuit calculates $OVRn=(Cn|(MSB2\neq 0))$ to generate an n-th bit of an overflow value of the current iteration, the overflow value has N bits, MSB2 is a most significant bits part of the stride, an operator| is an OR operation, OVRn is an n-th bit of the overflow value, the control circuit selects at least one bit of the overflow value based on the data element length to generate N overflow bits, the control circuit inverts the overflow bits to generate N inverted overflow bits, and the control circuit accumulates the inverted overflow bits to generate an accumulated value;

a data processing circuit coupled to the control circuit to receive the multiplexer select signals and a read pointer, wherein the data processing circuit collects the first data elements from the bytes of the first line buffer based on the multiplexer select signals in the load mode, and the data processing circuit reads the second data elements from the elements of the first line buffer based on the read pointer in the store mode;

a second line buffer coupled to the data processing circuit to receive the first data elements or the second data elements, wherein the control circuit shifts the inverted overflow bits based on the write pointer to generate a first byte-write-enable signal in the load mode, the second line buffer determines byte locations of the second line buffer where the first data elements are written based on the first byte-write-enable signal in the load mode, the control circuit shifts the n-th inverted overflow bit of the inverted overflow bits based on an n-th offset value of the offset values to generate a corresponding bit corresponding bit in a second byte-write-enable signal in the store mode, and the second line buffer writes the second data elements of the second line buffer into the memory based on the second byte-write-enable signal and the most significant bits part of the current base address in the store mode; and a second routing circuit coupled to the second line buffer, wherein the second routing circuit couples the vector register file to the second line buffer in the load mode, and the second routing circuit couples the memory to the second line buffer in the store mode, wherein the control circuit updates the read pointer based on the accumulated value.

* * * * *